United States Patent
Grillos, II et al.

(10) Patent No.: US 12,515,823 B2
(45) Date of Patent: Jan. 6, 2026

(54) ROCKET INCLUDING ROTATABLE ARM FOR ENGAGING A CABLE DURING DESCENT AND METHOD FOR THE SAME

(71) Applicant: Blue Origin Manufacturing, LLC, Huntsville, AL (US)

(72) Inventors: Emmanuel John Grillos, II, Kent, WA (US); Richard Donovan Jones, East Wenatchee, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

(21) Appl. No.: 18/433,097

(22) Filed: Feb. 5, 2024

(65) Prior Publication Data
US 2024/0253824 A1    Aug. 1, 2024

Related U.S. Application Data

(62) Division of application No. 17/660,809, filed on Apr. 26, 2022, now Pat. No. 12,139,278.

(51) Int. Cl.
*B64G 1/62* (2006.01)
*B63B 35/50* (2006.01)

(52) U.S. Cl.
CPC .............. *B64G 1/62* (2013.01); *B63B 35/50* (2013.01)

(58) Field of Classification Search
CPC ............ B64G 1/62; B64G 1/625; B63B 35/50
USPC ...................................................... 244/158.9
See application file for complete search history.

(56) References Cited

U.S. PATENT DOCUMENTS

| | | |
|---|---|---|
| 2,807,429 A | 9/1957 | Hawkins et al. |
| 3,053,479 A | 9/1962 | Seigel et al. |
| 3,295,790 A | 1/1967 | Webb |
| 3,309,044 A | 3/1967 | Strance et al. |
| 4,604,938 A | 8/1986 | Kennedy et al. |
| 5,667,167 A | 9/1997 | Kistler |
| 5,873,549 A | 2/1999 | Lane et al. |
| 5,927,653 A | 7/1999 | Mueller et al. |

(Continued)

FOREIGN PATENT DOCUMENTS

| | | |
|---|---|---|
| FR | 3088894 | 5/2020 |
| GB | 2172247 | 9/1986 |

(Continued)

OTHER PUBLICATIONS

Ishijima et al. Re-entry and Terminal Guidance for Vertical-Landing TSTO (Two Stage to Orbit). A Collection of Technical Papers. Part 1. AIAA Guidance, Navigation, and Control. Conference and Exhibit. Aug. 10-12, 1998, Boston, MA. American Institute of Aeronautics and Astronautics. pp. 192-200.

(Continued)

*Primary Examiner* — Brady W Frazier
(74) *Attorney, Agent, or Firm* — Knobbe, Martens, Olson & Bear, LLP

(57) ABSTRACT

Systems and methods for receiving a descending rocket, which may be at sea. The rocket may descend vertically with the nose higher than the nozzle. The rocket body may be angled as it descends. A boom arm with hooks may extend at an angle to the rocket body to engage a cable suspended by a semisubmersible platform at sea. The platform may include a dampened cable and lateral straps for securing and rotating the rocket into a horizontal orientation. The platform may receive a ship and purge water to elevate the platform for placing the horizontal rocket onto the ship.

19 Claims, 13 Drawing Sheets

(56) References Cited

U.S. PATENT DOCUMENTS

| | | | |
|---|---|---|---|
| 6,024,006 | A | 2/2000 | Kindem et al. |
| 6,176,451 | B1 | 1/2001 | Drymon |
| 6,450,452 | B1 | 9/2002 | Spencer et al. |
| 6,874,729 | B1 | 4/2005 | McDonnell |
| 7,097,137 | B2 | 8/2006 | McDonnell |
| 8,047,472 | B1 | 11/2011 | Brand et al. |
| 8,498,756 | B1 | 7/2013 | Sarver |
| 8,678,321 | B2 | 3/2014 | Bezos et al. |
| 10,093,433 | B2 | 10/2018 | Knudsen et al. |
| 10,252,819 | B2 | 4/2019 | Knudsen et al. |
| 10,597,173 | B2 | 3/2020 | Knudsen et al. |
| 10,800,545 | B2 | 10/2020 | McDonnell |
| 10,822,122 | B2 | 11/2020 | Grose et al. |
| 11,059,610 | B2 | 7/2021 | Knudsen et al. |
| 11,738,890 | B2 | 8/2023 | Knudsen et al. |
| 12,103,716 | B2 | 10/2024 | Song |
| 2007/0012820 | A1 | 1/2007 | Buehler |
| 2016/0311556 | A1 | 10/2016 | Knudsen et al. |
| 2018/0044035 | A1 | 2/2018 | McDonnell |
| 2018/0178930 | A1 | 6/2018 | Grose et al. |
| 2019/0055035 | A1 | 2/2019 | Knudsen et al. |
| 2020/0024009 | A1 | 1/2020 | Knudsen et al. |
| 2020/0367643 | A1 | 11/2020 | Fu |
| 2021/0009288 | A1 | 1/2021 | Knudsen et al. |
| 2021/0047058 | A1 | 2/2021 | Nawojczyk |
| 2022/0135259 | A1 | 5/2022 | Knudsen et al. |
| 2023/0192327 | A1 | 6/2023 | Song |
| 2023/0339628 | A1 | 10/2023 | Grillos |
| 2025/0108941 | A1 | 4/2025 | Song |

FOREIGN PATENT DOCUMENTS

| | | |
|---|---|---|
| WO | WO 2017/142117 | 8/2017 |
| WO | WO 2019/021036 | 1/2019 |

OTHER PUBLICATIONS

OctaGrabber Compendium. By Scr00chy. Published Mar. 19, 2019. Updated Jun. 16, 2020. Retrieved Jun. 29, 2020. www.elonx.net.octagrabber. pp. 1-16.

Solid Rocket Boosters and post-launch processing. Nasa Facts. John F. Kennedy Space Center. Kennedy Space Center, Florida 32899. 17 pages. 2004.

Waters et al. "Test Results of an F/A-18 Automatic Carrier Landing Using Shipboard Relative GPS." Proceedings of the ION 57th Annual Meeting and the CIGTF 20th Biennial Guidance Test Symposium. Jun. 11-13, 2001. The Institute of Navigation. pp. 841-851.

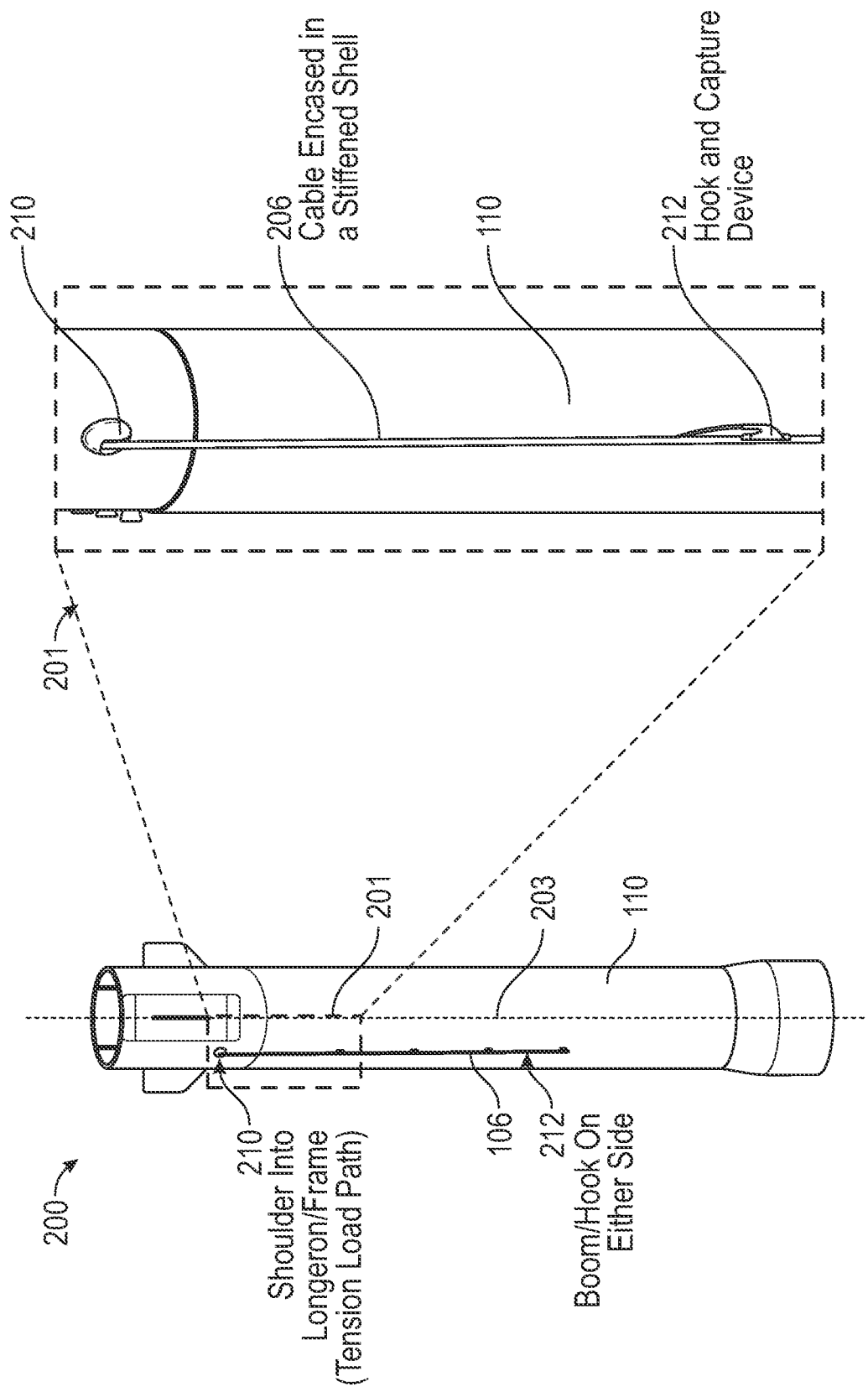

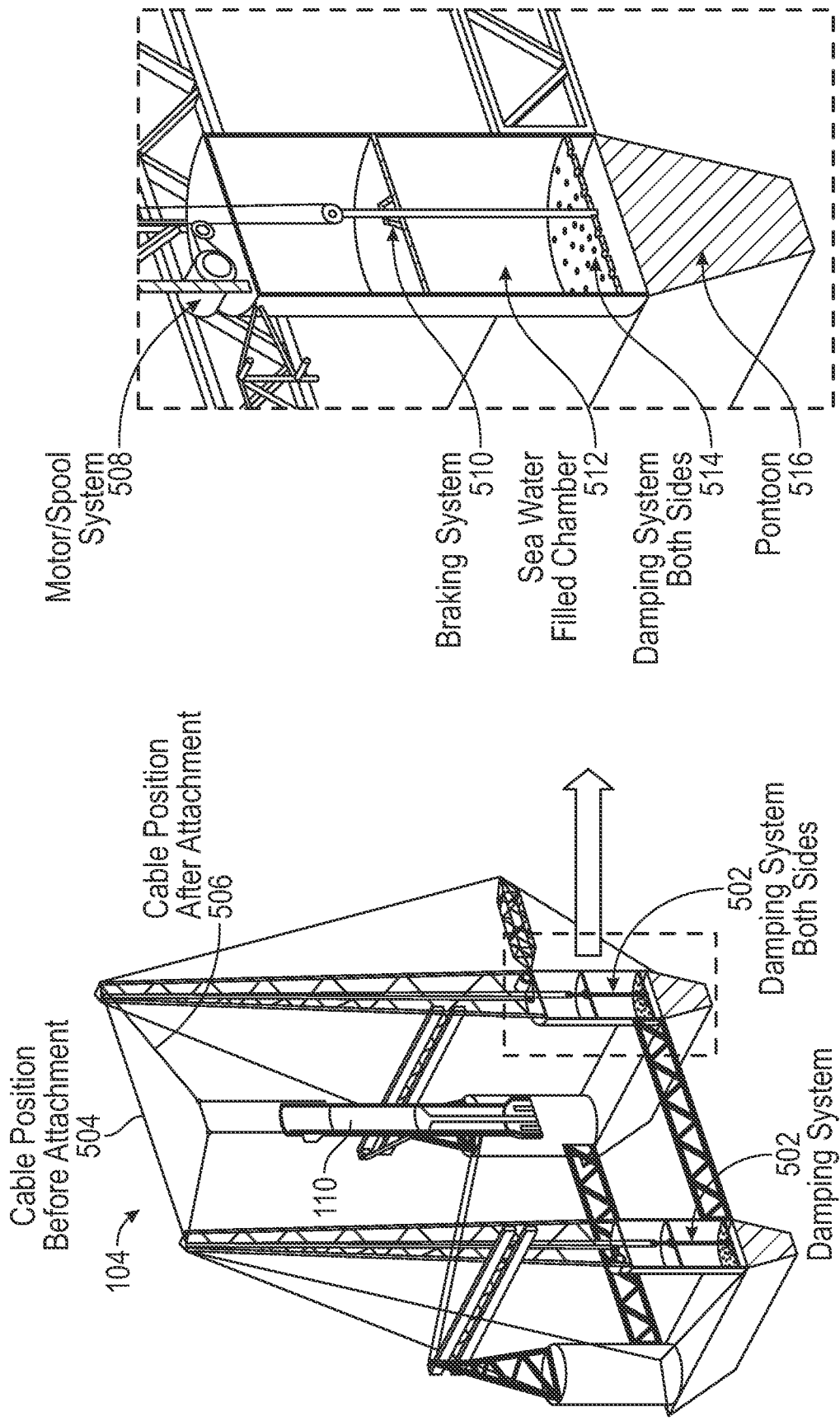

ROCKET INCLUDING ROTATABLE ARM FOR ENGAGING A CABLE DURING DESCENT AND METHOD FOR THE SAME

CROSS-REFERENCE TO RELATED APPLICATIONS

This application is a divisional of U.S. patent application Ser. No. 17/660,809, filed Apr. 26, 2022, the entire content of which is incorporated by reference herein.

BACKGROUND

Field of the Invention

The technology relates to rockets, in Particular to Vertical Landing of Rockets.

Description of the Related Art

Single use rockets for placing objects into orbit are a significant cost for typical space missions. There is a need for improved systems for returning rockets to earth for reuse on multiple missions.

SUMMARY

Various embodiments of systems, methods, and devices within the scope of the appended claims each have several aspects, no single one of which is solely responsible for the desirable attributes described herein. Without limiting the scope of the appended claims, some prominent features are described herein.

Disclosed herein are systems and methods for receiving a descending reusable launch vehicle (may also be referred to herein as a rocket). Systems and methods disclosed herein may be used to receive a rocket at sea and position the rocket onto a ship for return to a launch site. Advantageously, the disclosed approach negates the need for heavy landing gear in reusable rocket systems, in favor of lighter weight boom arms, among other advantages. Additionally, the disclosed approach may allow for a more efficient and rapid method to stabilize and/or reorient a landed rocket. Systems and methods disclosed herein may be used to receive a rocket in a land-based system and position the rocket onto a vessel, such as a land-based transport, for return to a base or other site.

In one aspect, a system for receiving a descending rocket at sea is provided. The system includes a semisubmersible vessel includes supports spaced apart to define a ship receiving space. The semisubmersible vessel is configured to receive and purge seawater to, respectively, lower and raise the supports in a direction along a z-axis of the system, and to receive a ship moving in a direction along a y-axis of the system into the ship receiving space. The system also includes first and second towers, each extending vertically from a respective support. Upper portions of each tower are configured to be located above sea level and spaced apart a distance measured along an x-axis of the system to define therebetween an upper portion of a rocket receiving space. The system further includes a cable configured to be suspended between the first and second towers and extend across the upper portion of the rocket receiving space. The cable is configured to engage an attachment of the descending rocket to decelerate and suspend the rocket in a substantially vertical orientation thereon in the rocket receiving space. The system also includes a first rail and a second rail, each rail extending from a first end to a second end in a direction along the y-axis of the system above sea level. The first rail and the second rail are spaced apart a distance measured along the x-axis of the system to define therebetween a lower portion of the rocket receiving space. The system further includes a strap extending in a direction along the x-axis of the system across the lower portion of the rocket receiving space. The strap includes a first end movably coupled to a first end of the first rail. The strap further includes a second end movably coupled to the first end of the second rail. The strap is configured to partially surround and stabilize a lower portion of the suspended rocket when the first end of the strap moves along the first rail to the second end of the first rail and the second end of the strap moves along the second rail to the second end of the second rail. The cable is configured to lengthen with the suspended rocket thereon, and the length of the strap between the first end and the second end is configured to shorten as the cable is lengthened with the suspended rocket thereon, such that the rocket is rotated into a substantially horizontal orientation for lowering onto the ship.

The system can also include a second strap extending in a direction along the x-axis of the system across the lower portion of the rocket receiving space. The second strap can include a first end movably coupled to a second end of the first rail. The second strap can further include a second end movably coupled to the second end of the second rail. The second strap can be configured to partially surround and stabilize a lower portion of the suspended rocket when the first end of the second strap moves along the first rail to the first end of the first rail and the second end of the strap moves along the second rail to the first end of the second rail.

The system can also include a deballasting system configured to deballast sea water from the semisubmersible vessel to decrease a draft of the vessel from a first draft to a second draft.

The semisubmersible vessel can be configured to be maintained at the first draft as the rocket is received on the cable.

The semisubmersible vessel can be configured to be maintained at the second draft as the rocket is lowered onto the ship.

The semisubmersible vessel can include a deck including one or more ship support members. The one or more ship support members can be configured to be submerged below a waterline of the vessel as the rocket is received on the cable and the ship enters the ship receiving space, and be further configured to be above the waterline of the vessel as the rocket is lowered onto the ship.

The system can include a dampening system configured to dampen forces on the cable due to the attachment of the descending rocket engaging the cable.

The dampening system can include a spool with the cable partially wrapped thereon and configured to pay out the cable to allow the cable to lengthen; and a piston attached to the cable and located at least partially in a sea water-filled chamber.

The sea water-filled chamber can be located within one of the supports.

The semisubmersible vessel can include a port pontoon connecting supports located on a port side of the semisubmersible vessel and a starboard pontoon connecting supports located on a starboard side of the semisubmersible vessel.

In another aspect, a system for receiving a rocket at sea is provided. The system includes a rocket having a body extending along a longitudinal axis, the rocket configured to descend in a terminal flight path having a non-vertical component. The system also includes at least one arm rotatably connected with the body and having at least one hook, wherein, with the arm oriented at an angle to the longitudinal axis that is substantially perpendicular to a direction of the terminal flight path, the hook is configured to engage a cable suspended at sea to suspend the rocket from the cable.

The terminal flight path can have a glide scope of −45 degrees.

The at least one arm can be configured to be locked in an orientation that is substantially perpendicular to the direction of the terminal flight path.

The at least one arm can be configured to rotate in a plane tangential to a circumferential outer surface of the body.

The arm can be configured to rotate 360 degrees.

The rocket can include a control mixer configured to simultaneously command engine thrust of the rocket, Thrust Vector Control (TVC) angle of the rocket, and a forward thruster of the rocket.

In a further aspect, a method of receiving a descending rocket at sea is provided. The method includes descending a rocket along a flight path having a non-vertical component with a nose of the rocket located higher than a nozzle of the rocket. The method also includes deploying an arm of the rocket such that the arm is oriented substantially perpendicular to the direction of the flight path. The method also includes engaging a hook of the arm with a cable suspended by a semisubmersible platform at sea.

The method can also include rotating the rocket to a substantially horizontal orientation.

The method can also include decreasing a draft of the platform to raise the platform relative to sea level.

The method can also include receiving a ship at least partially into a ship-receiving space of the platform and placing the horizontally-oriented rocket onto the ship.

In yet another aspect, a system for receiving a descending rocket is provided. The system includes a vessel; a cable suspended by the vessel and configured to engage the descending rocket and suspend the rocket therefrom; and a strap supported by the vessel, wherein the strap is configured to translate to cause the suspended rocket to rotate toward a horizontal orientation.

The strap can be configured to increase in length to stabilize the suspended rocket.

The cable can be configured to increase in length and the strap can be configured to decrease in length to rotate the rocket toward a horizontal orientation.

The system can further include a rail, wherein ends of the strap are moveably connected to the rail.

The vessel can include a semisubmersible vessel at sea, the semisubmersible vessel configured to receive and purge seawater to, respectively, lower and raise the semisubmersible vessel in a vertical direction.

The system can further include a rail, wherein ends of the strap are moveably connected to the rail, wherein the cable is configured to increase in length and the strap is configured to decrease in length to rotate the rocket toward a horizontal orientation.

The vessel can include a semisubmersible vessel at sea, the semisubmersible vessel configured to receive and purge seawater to, respectively, lower and raise the semisubmersible vessel in a vertical direction.

BRIEF DESCRIPTION OF THE DRAWINGS

These and other aspects of the present disclosure will be described in the detailed description and the appended claims that follow, and in the accompanying drawings.

FIGS. 2A and 2B illustrate an example retention device of a rocket, such as the rocket of FIG. 1B.

FIGS. 4F and 4G illustrate an example dampening system that may be used with the system of FIGS. 1A and 1B.

Figure 1A:
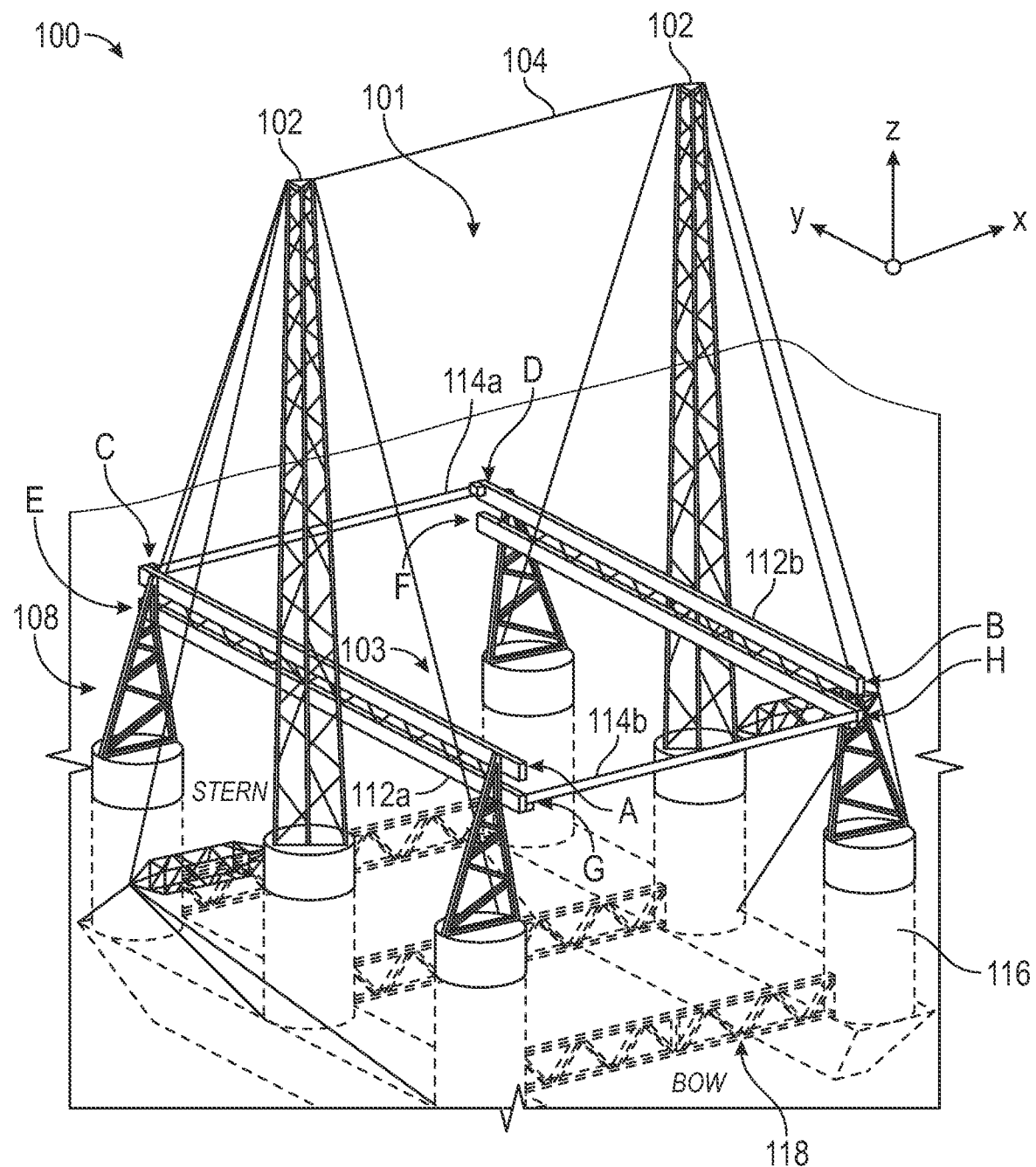
FIGS. 1A and 1B illustrate an example system for receiving and stabilizing a descending rocket at sea.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Although certain preferred embodiments and examples are disclosed below, inventive subject matter extends beyond the specifically disclosed embodiments to other alternative embodiments and/or uses and to modifications and equivalents thereof. Thus, the scope of the claims that may arise here from is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

A. Example System for Receiving a Descending Rocket at Sea

Figure 1B:
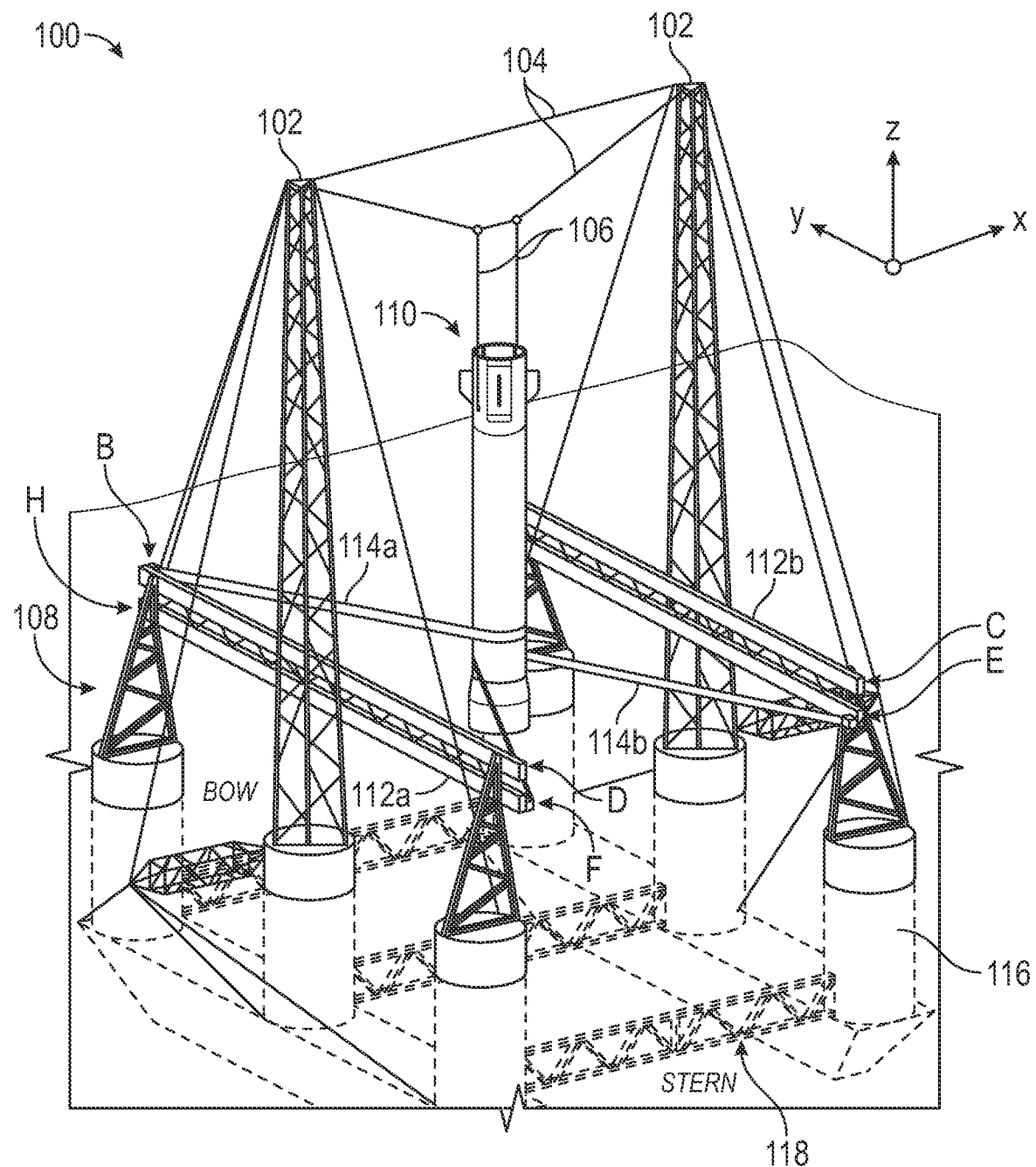

FIGS. 1A and 1B illustrate an embodiment of a system 100 for receiving a descending rocket 110 on a vessel 108 at sea. FIG. 1A illustrates the system 100 before receiving the descending rocket 110. FIG. 1A illustrates the system 100 as viewed from the starboard bow of the vessel 108. FIG. 1B illustrates the system 100 in a state after receiving the rocket 110. FIG. 1B illustrates the system 100 as viewed from the port quarter of the vessel 108. An X-Y-Z coordinate system is shown for reference for description of the system and is not intended to limit the scope of the disclosure. The Z direction is generally in the vertical direction relative to sea level, the X direction extends laterally across the system 100, and the Y direction is perpendicular to the X and Y directions.

The system 100 includes a semisubmersible vessel 108. Portions of the vessel 108 are configured to be submerged below sea level and then transition back to a position above sea level. As will be described in detail below, the system 100 can also stow and transport the rocket to a new location after descent. In some embodiments, as further described herein, the semisubmersible vessel 108 comprises supports 116 spaced apart to define a ship receiving space 103, with the semisubmersible vessel 108 configured to receive and purge seawater to, respectively, lower and raise the supports 116 in a direction along a z-axis of the system 100, and to receive a ship moving in a direction along a y-axis of the system 100 into the ship receiving space 103.

The vessel 108 may include a plurality of towers 102 that extend vertically, generally parallel to a z-axis of the system 100 (such as defined by the coordinate system illustrated in FIGS. 1A and 1B). At least a portion of the towers 102 are above sea level. The towers 102 may be configured to support one or more cables 104 suspended between at least two of the towers 102. The towers 102 may be spaced so that a rocket 110 may be received into a rocket receiving space 101 between the towers 102. The rocket 110 may descend from flight and be received into the rocket receiving space 101. The rocket receiving space 101 may be an opening of the vessel 108 defined at least in part in between the opposing towers 102. An upper portion of the rocket receiving space 101 may be defined between the towers 102. In some embodiments, as further described, there may be first and second towers 102, each extending vertically from a respective support 116, where upper portions of each tower 102 are configured to be located above sea level and spaced apart a distance measured along an x-axis of the system 100 to define therebetween an upper portion of the rocket receiving space 103.

In the non-limiting example illustrated in FIGS. 1A and 1B, the vessel 108 includes a plurality of rails 112a, 112b. The rails 112a, 112b can extend in a direction along a y-axis of the system. The rails 112a, 112b may be configured to extend horizontally above sea level. The rails 112a, 112b may be near a base of one or more towers 102. The rails may be spaced apart a distance measured along the x-axis of the system 100. The rails may define a lower portion of the rocket receiving space 101. The plurality of rails may be configured to support one or more straps 114a, 114b that extend across the lower portion of the rocket receiving space 101 in a direction measured along the x-axis of the system. Each strap 114a, 114b includes a first end movably coupled to the rail 112a and a second end movably coupled to the rail 112b. The strap 114a may be spaced a distance generally parallel to the z-axis of the system 100 from the strap 114b. The first end and the second end of each strap 114a, 114b may be moved in a direction along the y-axis of the system 100 so as to engage a lower portion of a rocket 110. The first ends and the second ends of the straps 114a, 114b can move in generally opposite directions. For example, the first end and the second end of the strap 114a may be configured to move in a first direction generally parallel to the y-axis of the system 100, from a first end of the rails 112a, 112b, respectively, to a second end of the rails 112a, 112b, respectively. The first end and the second of the strap 114b may be configured to move in a second direction that is generally parallel to the y-axis of the system and opposite to the first direction, from the second end of the rails 112a, 112b, respectively, to the first end of the rails 112a, 112b, respectively.

One or more of the straps 114a, 114b may be configured to lengthen and shorten between its respective two ends. The strap may lengthen by paying out more strap. As shown, each end of each of the straps 114a, 114b may be connected to a moveable connection 105. The connection 105 connects the strap to the respective rail 112a, 112b. The connection 105 may be or include a device that pays out the strap 114a, 114b. Such device may be a pulley on a motor, where the strap 114a, 114b may be allowed to pay out due to the weight of the rocket 110 bearing on the strap 114a, 114b and lengthen the strap 114a, 114b. The motor may be actuated to reel in the strap 114a, 114b and shorten its length. One or both ends of a particular strap may pay out and/or be reeled in. The connection 105 may be translated along the rails 112a, 112b as described.

Alternatively or in addition, one or more of the straps 114a, 114b may stretch in response to a force applied to the strap. In some embodiments, the straps 114a, 114b may be elastic and configured to lengthen in response to increased force applied to the strap due to the rocket bearing on the strap. The straps 114a, 114b may then self-contract when the ends of the straps 114a, 114b are translated along the rails 112a, 112b such that the force from the rocket 110 on the strap 114a, 114b decreases. In some embodiments, elastic straps 114a, 114b may pay out from and reel back into a device, such as described.

With reference to FIG. 1B, the system 100 is configured to receive and stabilize a rocket 110. The rocket 110 may include a plurality of boom arms 106. The boom arms 106 may include a hook or other retention device configured to engage one or more cables 104 of the vessel 108. As the rocket 110 descends, the retention device of the arm 106 of the rocket 110 may engage the cable(s) 104. The downward descent of the rocket 110 may be arrested after engagement. The engaged cable(s) 104 may be configured to support some or all of the weight of the rocket 110. In some examples, once the rocket has sufficiently reduced energy, the straps 114 may be moved so as to engage a portion of the rocket 110, such as an aft end of the rocket 110. The straps 114 may be configured to reduce a movement or stabilize the rocket 110 relative to the system 100. For example, the straps 114 can reduce translational movement of the rocket 110 in directions measured along the x-axis, the y-axis, and the z-axis of the system 100. The straps 114 can also reduce rotational movement of the rocket 110. Other movement dampeners or stabilizing mechanisms may also be used.

In some examples, the rocket 110 may be transferred to a transport vessel, such as a ship, after it is received and stabilized by the system 100. After descent and securement of the rocket 110, the vessel 108 may be configured to submerge further in the z-direction and to accept a ship into a transport vessel or ship receiving space 103 of the vessel 108. The ship receiving space 103 may be below the rocket receiving space 101 of the vessel 108. In some examples, the ship receiving space 103 may share common components or structures with the rocket receiving space 101 of the vessel. In some examples, one or more components of the vessel 108 may be configured to transfer the rocket 110 onto the ship when the vessel 108 is in the ship receiving position. In some examples, the one or more components may include the cable(s) 104 and/or strap(s) 114.

B. Example Vessel

The vessel 108, such as illustrated in FIGS. 1A and 1B, may include a plurality of towers 102. The plurality of towers 102 may extend vertically in the z-direction, such that at least a portion of the towers are above sea level. A height of the towers above sea level may be at least equal to a height of a rocket 110 in a substantially vertical orientation. In some examples, a height of the towers may be greater than the height of the rocket 110 in a substantially vertical orientation. For example, the height of the towers may be at least equal to a combined height of the rocket in a substantially vertical orientation and a length of boom arms of the rocket when the boom arms are in a fully-extended vertical position, as will be described below. In some examples, the height of the towers may be greater than the combined height of the rocket 110 in a substantially vertical orientation and the length of the fully-extended booms. For example, in one implementation, the height of the towers allows for displacement or extension of a cable 104 or other retention device in the z-direction when a rocket is suspended from the cable 104, such that a base of the rocket remains suspended above sea level after the rocket has engaged the cable 104.

In some examples, there may be at least two towers configured to support at least one cable. In some examples, there may be one or more other structures configured to serve a similar function as the plurality of towers 102. The towers 102 or other structures may be configured to support at least one cable 104. The cable 104 may be suspended between at least two of the towers 102 or from the one or more other structures. In some examples, more than one cable may be suspended. Advantageously, the use of more than one cable may allow for more opportunities for a rocket to engage a cable 104. With reference to FIGS. 1A and 1B, a system 100 may include at least two cables 104. In some examples, the cable(s) 104 may be suspended from a top or upper portion of a tower 102 (or other structure) to a top or upper portion of another tower 102 (or other structure). In some examples, the cable(s) may be supported or otherwise anchored at another location on a vessel other than the tower(s) 102. For example, the cable may be anchored at support locations at a lower portion of the vessel. The cable(s) may be anchored at one, two, three, four, five, six, or more locations. The support locations may be at support structures at the base of the tower(s) 102. As described herein, the cable(s) 104 may be configured to engage or catch a rocket as it descends into the rocket receiving space 101 between the towers 102 and/or to support at least some of the weight of the rocket while the rocket is suspended from the cable(s) 104. Support mechanism(s) at the support locations may be configured to anchor or support the cable(s) 104 with enough tension so as to allow the cable(s) 104 to flex, stretch, or otherwise engage the rocket 110 without breaking. The support mechanisms may be configured to anchor the cable(s) 104 to support the weight of the rocket 110 while the rocket 110 is suspended from the cable(s) 104. In some non-limiting examples, a cable 104 may be connected to a dampening system, such as described in detail below with reference to FIGS. 4F and 4G, to help dampen vertical motion of the rocket 110. In some embodiments, as further described herein, the cable 104 may be configured to be suspended between the first and second towers 102 and extend across the upper portion of the rocket receiving space 101, with the cable 104 further configured to engage an attachment, such as booms 106, of the descending rocket 110 to decelerate and suspend the rocket 110 in a substantially vertical orientation thereon in the rocket receiving space 101. In some embodiments, as further described herein, the cable 104 may be configured to lengthen with the suspended rocket 110 thereon, and the length of the strap 114a between its first end and second end is configured to shorten as the cable 104 is lengthened with the suspended rocket 110 thereon, such that the rocket 110 is rotated into a substantially horizontal orientation for lowering onto a ship 606 (see FIG. 4H).

The towers 102 may be arranged on the vessel 108 and spaced a distance from each other so that a rocket 110 may be received into the rocket receiving space 101 between the towers 102. The towers 102 may additionally or alternatively be spaced so as to allow a ship to be received into the ship receiving space 103 between the towers 102.

The vessel 108 may include a plurality of rails 112a, 112b. There may be two of the rails 112a. There may be two of the rails 112b. There may be one, three or more of each of the rails 112a and/or 112b. The plurality of rails 112a, 112b may extend horizontally above sea level. The plurality of rails 112a, 112b may extend in a direction generally parallel to the y-axis of the system 100. The rails may be near a base of one or more towers 102. The rails 112a, 112b may be spaced apart by a distance measured along the x-axis of the system to define a lower portion of the rocket receiving space 101. As described above, the rails 112a, 112b are configured to support one or more straps 114a, 114b, each strap extending between the rails 112a, 112b in a direction measured along the x-axis of the system. In some examples, the strap 114a is movably connected or coupled to the rail 112a and the rail 112b, such that the strap 114a can move in a direction along the y-axis of the system between positions along the rails or other suitable structures.

In one non-limiting example illustrated in FIG. 1A, a first end of the strap 114a movably coupled to the rail 112a is located at a first end of the rail 112a, at a position C. A second end of the strap 114a movably coupled to the rail 112b is located at a first end of the rail 112b, at a position D. As illustrated in FIG. 1B, the first end of the strap 114a has moved along rail 112a to a second end of rail 112a, at a position A (position A is located behind the suspended rocket 110 and is not visible in FIG. 1B). The second end of the strap 114a has also moved along the rail 112b to a second end of the rail 112b, at a position B. The strap 114b is also movably connected or coupled to the rail 112a and the rail 112b, such that the strap 114b can move in a direction along the y-axis of the system between positions along the rails or other suitable structures. In the non-limiting example illustrated in FIG. 1A, a first end of the strap 114b movably coupled to the rail 112a is located at the second end of the rail 112a, at a position G. A second end of the strap 114b movably coupled to the rail 112b is located at a second end of the rail 112b, at a position H. As illustrated in FIG. 1B, the first end of the strap 114b has moved along the rail 112a to the first end of the rail 112a, to a position E. The second end of the strap 114b has also moved along the rail 112b to the first end of the rail 112b, at a position F. In some embodiments, each rail 112a, 112b may extend from a first end to a second end in a direction along the y-axis of the system 100 above sea level, with the first rail 112a and the second rail 112b spaced apart a distance measured along the x-axis of the system 100 to define therebetween a lower portion of the rocket receiving space 103. In some embodiments, one or more of the straps 114a, 114b extend in a direction along the x-axis of the system 100 across the lower portion of the rocket receiving space 101, with the strap comprising a first end movably coupled to a first end of the first rail 112a, with the strap further comprising a second end movably coupled to the first end of the second rail 112b, the strap configured to partially surround and stabilize a lower portion of the suspended rocket 110 when the first end of the strap moves along the first rail 112a to the second end of the first rail 112a and the second end of the strap moves along the second rail 112b to the second end of the second rail 112b.

The strap 114a may be at a height above sea level such that when the strap 114a engages the rocket 110, the strap 114a engages at a first height from the base of the rocket 110. The strap 114b may be at a height above sea level such that when the strap 114b engages the rocket 110, the strap 114b engages at a second height from the base of the rocket 110. In some examples, the second height may be different than the first height, such as lower than the first height. In some examples, a difference between the first height and the second height may be less than half, a third, or a quarter of a height of the rocket.

The vessel 108 may include one or more actuators configured to move the straps 114a, 114b along the rails 112a, 112b. The one or more actuators may include a motor, hydraulic device, pneumatic device, or other suitable devices. In some examples, the one or more straps 114a, 114b may be held in a stored position with a first suspended length before being moved along the rails 112a, 112b. In some examples, the one or more straps 114a, 114b may have a second suspended or engaged length after being moved along the rails 112a, 112b and engaged with the rocket 110. The second suspended length may be longer than the first suspended length. In some examples, the system may move the straps 114a, 114b after a rocket is received into the rocket receiving space 101. The straps may be configured to have sufficient tension when engaged with the rocket 110 so that horizontal movement of the rocket 110 is dampened. The straps 114a, 114b may be moved to opposing sides of the rocket receiving space 101 of the vessel 108 such that the strap 114a engages the rocket 110 to apply a first force on the body of the rocket in a first direction and the strap 114b may engage the rocket 110 to apply a second force on the body of the rocket in a second direction approximately opposite to or opposing the first direction. Further straps providing other applied forces may also be implemented in embodiments of the present disclosure.

With continued reference to FIGS. 1A and 1B, portions of the vessel 108 may be submersible or semi-submersible. For example, at least a first portion of the vessel 108 may be configured to be temporarily submerged underwater, for example for a selected period of time. The vessel 108 may be configured to float such that at least a second portion of the vessel 108 remains above sea level when the first position of the vessel 108 is submerged. In some examples, at least a portion of a support portion of the vessel 108 may be submersible. In some examples, the vessel 108 may include a plurality of supports 116, such as pillars, configured to support the plurality of towers 102 and the rails 112a, 112b. The support pillars may be configured to at least partially submerge below sea level temporarily, for example for a selected period of time.

As described in more detail below with reference to FIG. 4H, a transport ship or vessel may be configured to be received into the ship receiving space 103 of the vessel 108. The ship receiving space 103 may be below the rocket receiving space 101 of the vessel 108. The ship receiving space 103 may be a part of the rocket receiving space 101 of the vessel 108. The ship receiving space 101 may include a space between supports 116 of the vessel 108.

In some examples, the vessel or portions of the vessel 108 may be configured to adjust its ballast in order to decrease or increase the draft of the vessel 108 with respect to sea level. For example, the vessel 108 may have a submersed position wherein at least some of the support portion of the vessel 108 is submerged underwater. The submerged position may be a default, rocket receiving position before and during receipt of the rocket 110 into the rocket receiving space 101 of the vessel 108. The vessel 108 has a first draft in the default, rocket receiving position, where the draft is a vertical distance between the waterline and the bottom of the hull of the vessel 108. After the rocket 110 is engaged, a transport ship (such as shown in FIG. 4H) may be positioned under the engaged rocket and between the towers of the vessel 108 in the ship receiving space 103 of the vessel 108. During positioning of the transport ship within the ship receiving space 103, the vessel 108 is maintained at the first draft. After the ship is located in the ship receiving space 103 and ready to receive the rocket 110, the vessel 108 may move from the default, rocket receiving position to a dry-docking position, wherein the draft of the vessel 108 is decreased to a second draft that is less than the first draft. The vessel 108 may be configured to purge ballast in order to move from the default, rocket receiving position to the dry-docking position. After the transport ship receives the rocket 110, the vessel 108 may also be configured to take on ballast and increase the draft of the vessel 108 to return to a submerged position, such as the default, rocket receiving position. The vessel 108 may be maintained in the default, rocket receiving position, or another submerged position, when the vessel 108 is transported (by its own power or by towing) to a different location, such as a different rocket landing position. It will be understood that the above-described examples are not limiting, and that the draft of the vessel 108 can be changed depending on the requirements of the vessel 108.

C. Example Retention Device of a Rocket

FIGS. 2A and 2B illustrate an example retention device 200 of a rocket, such as a rocket 110 illustrated in FIGS. 1A and 1B. The rocket 110 in FIG. 1B is one embodiment of a rocket. The rocket 110 illustrated in FIGS. 1B, 2A, and 2B are thus merely example rockets, and the retention device 200 and other aspects of the present disclosure can be suitably implemented in other rockets.

In some embodiments, the retention device 200 may include one or more boom arms 106. The one or more boom arms 106 may include one or more capture devices 212, such as a hook, configured to capture a suspended wire or cable, such as the cable 104 (shown in FIGS. 1A and 1B). The one or more capture devices 212 may be configured to be on an inward facing side, edge, or point of the boom arm 106. Additionally or alternatively, the one or more capture devices 212 may be configured to be on an outward facing side, edge, or point of the boom arm 106. In some examples, multiple capture devices 212 may be configured to be placed at multiple points on the boom arm 106. There may be one, two, three, four, or more points on a boom arm 106 that include a capture device 212. In some examples, the capture devices 212 may be placed on the same side of the boom arm 106. In some examples, the capture devices 212 may be placed on different sides of the boom arm 106. For example, capture devices 212 may be positioned on alternate sides of the boom arm 106. Capture devices 212 may be spaced at intervals to cover a majority of the length of the boom arm 106. In some examples, the capture devices 212 may be configured to be equally spaced along the length of the boom arm 106.

The capture device 212 may include a hook or other projection configured to engage, capture, mate, or otherwise couple with a suspended wire or cable. For example, the capture device 212 can be a hook, clip, or carabiner. The capture device 212 can be configured to retain or hold a wire or cable once it is engaged. For example, the capture device 212 may be configured to retain or hold a wire or cable such that the weight of the rocket 110 can be suspended from the wire or cable.

As further shown in FIGS. 2A and 2B, the one or more boom arms 106 may be a length more than, less than, or equal to a length of the rocket 110. In some examples, the boom arm 106 may be at least half of the length of the rocket 110. In some examples, the boom arm 106 may be 60 feet or more in length. The one or more boom arms 106 may include one, two, or more boom arms. In some embodiments, the rocket 110 may include two boom arms 106 configured to be on opposing sides or points of the rocket 110. For example, a first boom arm 106 may be on a first side of the rocket 110 and a second boom arm 106 may be on a second side of the rocket 110 approximately 180° (degrees) from the first side.

The one or more boom arms 106 may be configured to connect to the rocket 110 at a shoulder 210. The shoulder 210 may be connected to or configured to connect to a longeron or frame of the rocket 110. The boom arm 106 may be configured to connect at the confluence of a longeron (or load bearing structure) and a bulkhead frame (or other structurally supporting member) of the rocket 110. In some examples, the boom arm 106 may be configured to attach to a point on the rocket 110 that is 45° from a forward fin location on the rocket 110. For example, a shoulder location may be 45° between polar coordinates of fins of the rocket 110.

The boom arm 106 may be configured to rotate about the shoulder 210. The boom arm 106 may be configured to rotate up to or over a full 360° from a stored position. FIGS. 2A and 2B depicts the boom arm 106 in a stored position, while FIG. 1B depicts the boom arm 106 rotated 180° degrees from the stored position. In some examples, the boom arm 106 may be configured to rotate using powered or actuatable hinges at the shoulder 210. A stored position may include a position wherein a majority of the length of the boom arm is stored adjacent to a side of the rocket 110. In some examples, the boom arm 106 may have an engagement position or positions. The engagement position may include a position at which the boom arm forms an angle, or range of angles, relative to a longitudinal axis 203 of the rocket 110. The angle or range of angles may be an angle that is perpendicular to the terminal glide slope of the rocket 110 during descent. The terminal glide slope may be the direction the rocket 110 is travelling immediately prior to engaging the cable 104. In some examples, the angle or range of angles may be 45° from the horizon. The boom arm 106 may be configured to move between angular positions based on an ascent, travel, or descent stage of the rocket. In some examples, rotation of the boom arm 106 may be stopped at a particular angular position relative to the longitudinal axis 203 of the rocket, or released from a particular angular position relative to the longitudinal axis 203 of the rocket, based on the different stages of flight of the rocket. For example, if a rocket is ascending, a boom arm may be stopped in a stored position, in which the boom arm forms a 0° angle relative to the longitudinal axis 203 of the rocket. In another example, if a rocket is descending and/or at a certain point in its descent, a boom arm may be rotated from the stored position to a descent position, in which the boom arm forms a 450 angle relative to the longitudinal axis 203 of the rocket.

In some examples, the capture device 212 may include some combination of one or more cables encased in a stiffened shell 206, such as shown in inset 201 of FIG. 2B. The one or more cables of the capture device 212 may include a flexible graphite rod. The stiffened shell 206 may include a stiffened graphite shell. Advantageously, the use of a stiffened shell may allow for landing of the rocket with just one hook on one side of the rocket. In an example scenario where only one capture device 212 on one boom arm 106 engages the cable 104 of a vessel 108, the stiffened shell 206 may be configured to fail, allowing for rotation of the rocket about the center of gravity of the rocket as the flexible graphite rod bears the full load of the rocket 110. The stiffened shell 206 may be configured to be reusable from flight to flight. A load path when the capture device 212 is engaged with a cable may be from the capture device 212 to the flexible graphite rod to the shoulder to the interstage junction of the rocket 110.

Figure 3:
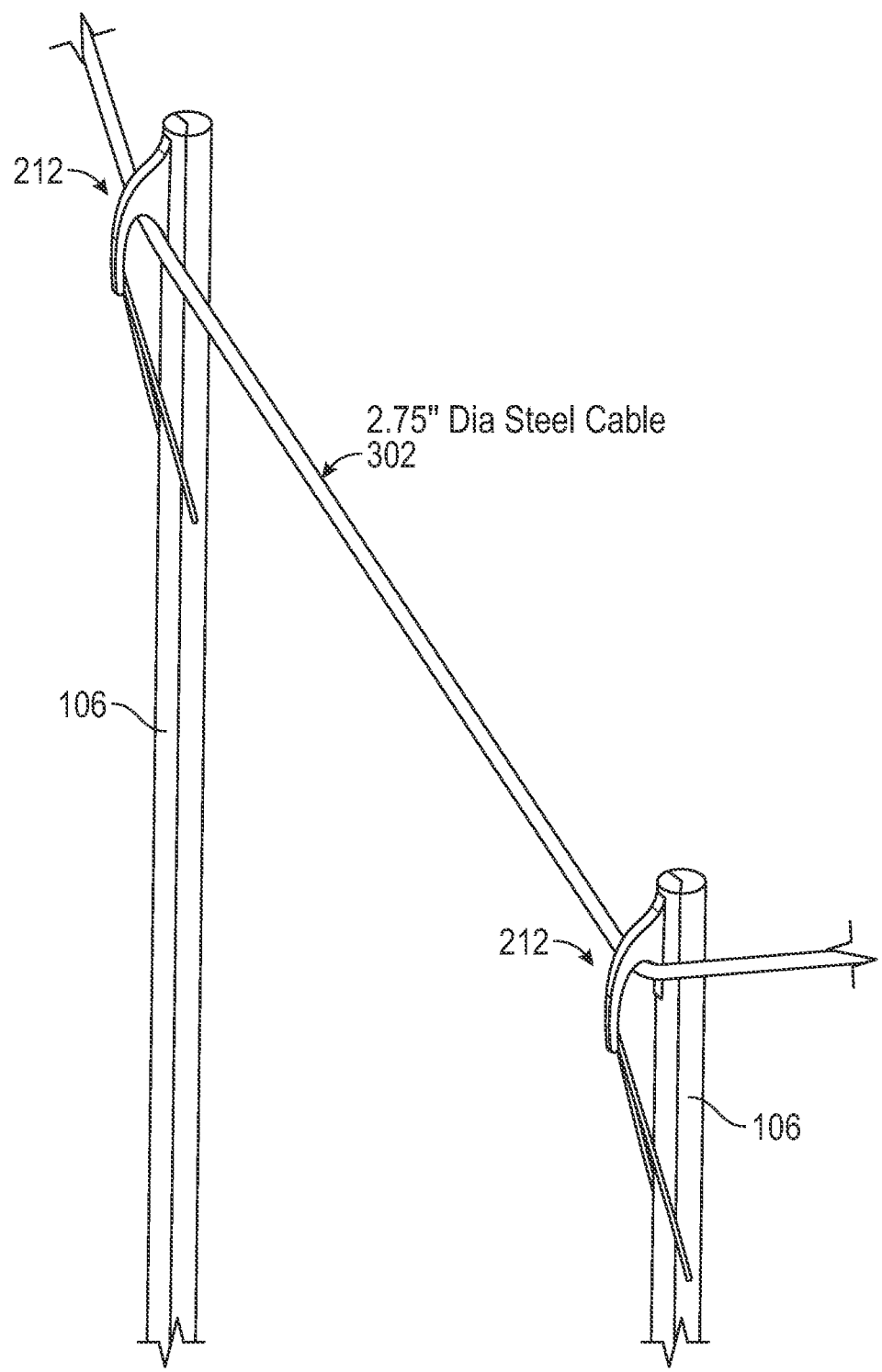
FIG. 3 illustrates an example plurality of retention devices and a cable that may be used with the system of FIGS. 1A and 1B.

FIG. 3 illustrates a non-limiting example of the capture device 212 shown engaging a cable 302. The capture device 212 in this example is a self-closing hook configured to engage the cable 302. The capture device 212 may be configured to engage a cable at a velocity less than, greater than, or equal to 1, 2, 3, 4, 5, 6, 7, 8, 9, 10, 11, 12, 13, 14, 15, 20, or 25 feet per second vertically and/or 1, 2, 3, 4, 5, 6, 7, 8, 9, 10, 11, 12, 13, 14, 15, 20, or 25 feet per second horizontally.

The cable 104 or 302 may be strong enough to support at least a weight of the rocket 110. FIGS. 1A and 1B illustrate example capture devices 212, engaged with the cable 104 of the vessel 108. In some examples, the cable 104 may be configured to support at least 100, 200, 300, 400, or 500 tons. The cable 104 may be a woven steel cable. A load capability of the cable 104 may be better than a factor of 3. The cable 104 may be 2.75 inches in diameter. However, the cable 104 may be of a different material, size, or load capability that is greater than or less than noted above. The cable 104 may have the same or similar features as the cable 302, and vice versa.

D. Example Capture and Securement Process

Figure 4A:
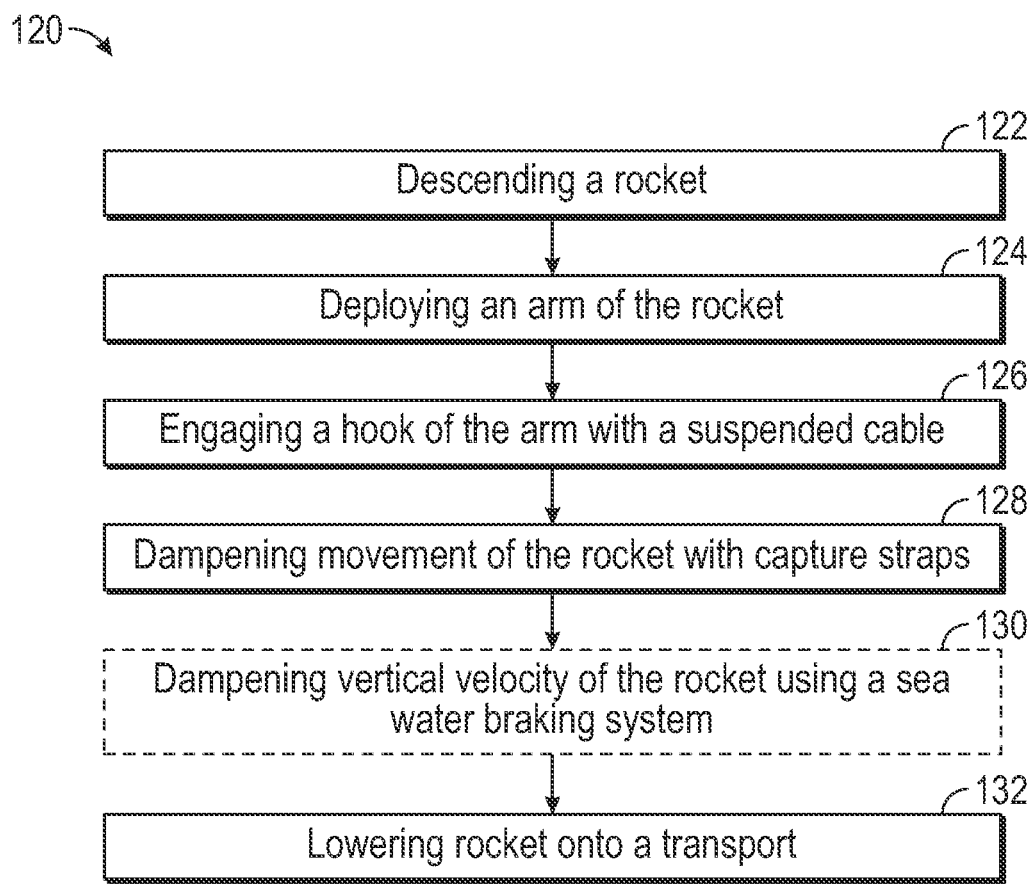
FIG. 4A illustrates an example method for receiving a descending rocket that may be performed by or with the system of FIGS. 1A and 1B.

FIG. 4A illustrates an example process 120 for receiving a descending rocket. The process 120 may use or be performed by the system 100. The process 120 may include step 122 where the rocket 110 is descending. In some examples, the rocket 110 may be descended vertically until it is near the cable 104. During vertical descent, the rocket 110 may descend at an angle that is substantially negative 90° from the horizon (for example, a glide scope of approximately −90°). When the rocket 110 is near the cable 104, the rocket 110 may assume a different glide slope as it approaches the cable 104 for capture. In some examples, the terminal flight path has a non-vertical component. In one non-limiting example, the rocket assumes a terminal glide scope of negative 45° (for example, substantially −45° from the horizon). The glide scope may be an angle greater than negative 90° with respect to the horizon that facilitates an easier or more efficient engagement of a retention device 200 of the rocket 110 with the cable 104. In some embodiments, the rocket 110 may descend in a substantially vertical orientation with the nose located above the engine nozzle and travelling with a horizontal velocity component so that the boom in a hook-landing position is substantially perpendicular to the cable 104, as further described herein, for example with respect to FIG. 4B.

The process 120 may then move to step 124, which includes deploying a retention device 200 of the rocket. The retention device 200 may include one or more boom arms 106, such as described above with reference to FIGS. 2A, 2B, and 3. In order to deploy the boom arm 106, the system may move the boom arm 106 from a stored or reentry position to a hook-landing position. In some examples, the system may include a powered hinge or hinges configured to move the boom arm 106 between positions. The retention device may extend the boom arm to the various positions as described herein with respect to FIG. 4B.

Figure 4B:
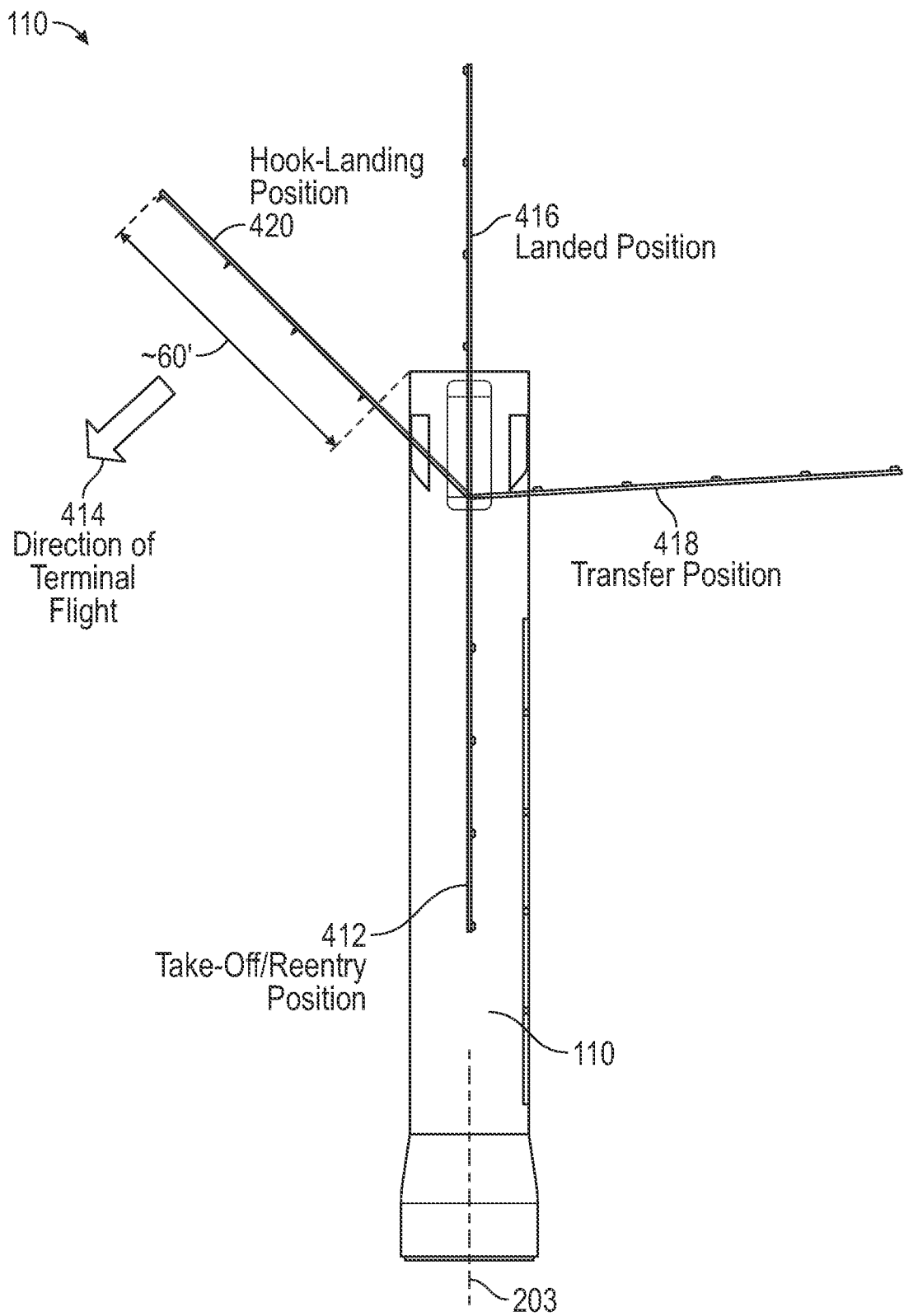
FIG. 4B illustrates example sequential positions of an embodiment of a boom arm during different stages of flight of a rocket that may be used with the system of FIGS. 1A and 1B.

FIG. 4B illustrates example positions of the boom arm 106 during different stages of flight. For example, the boom arm 106 may be positioned in, and rotate between, a take-off, stored, or reentry position 412, a transfer position 418, a landed position 416, and/or a hook-landing position 420. It will be understood that these positions are examples, and the boom arm 106 can be rotated or moved to other suitable positions at different stages of flight. The reentry position 412 may be a stowed position, where the boom arm 106 is configured to be stowed alongside the body of the rocket 110, substantially parallel with the longitudinal axis 203 of the rocket 110. The transfer position 418 may include a position or a plurality of positions between the reentry position 412 and the hook-landing position 420. The landed position 416 may be a position between the transfer position 418 and the hook-landing position 420. The landed position 416 may be a position vertical or approximately vertical with respect to the horizon. In one example, the landed position 416 is 180° from the reentry position 412.

The rocket 110 may be travelling in the direction 414 during terminal flight, for example immediately prior to the boom arm 106 engaging the cable 104 in the hook-landing position 420. The rocket 110 may be vertical or substantially vertical during terminal flight. Terminal flight may include a final length of the landing path of the rocket 110, which length may be 5,000 meters or less, 4,000 meters or less, 3,000 meters or less, 2,000 meters or less, 1,000 meters or less, 500 meters or less, 400 meters or less, 300 meters or less, 200 meters or less, 100 meters or less, 75 meters or less, 50 meters or less, or 25 meters or less. The hook-landing position 420 may be a position substantially perpendicular to a direction of terminal flight 414 as the rocket approaches the cable 104. In one example, the hook-landing position is 45° relative to the horizon. The hook-landing position 420 may be about 40°-50°, about 35°-55°, about 30°-60°, about 25°-65°, or about 20°-70° relative to the horizon.

Returning to FIG. 4A, the process 120 next moves to step 126, which includes engaging a capture device 212 of the boom arm 106 with a suspended cable 104. The suspended cable 104 may be the cable 104 suspended from towers 102 on a vessel 108. The capture device 212 may be configured to catch the cable 104 during descent. Once engaged, the now-coupled capture device 212 and the cable 104 may slow the momentum of the rocket 110. Significant motion of the rocket 110 relative to the vessel 108 may be substantially arrested or ceased when the rocket 110 is suspended from the cable 104 and the cable 104 bears some or all of the rocket weight. An example approach of the rocket 110 is shown in FIG. 4C.

Figure 4C:
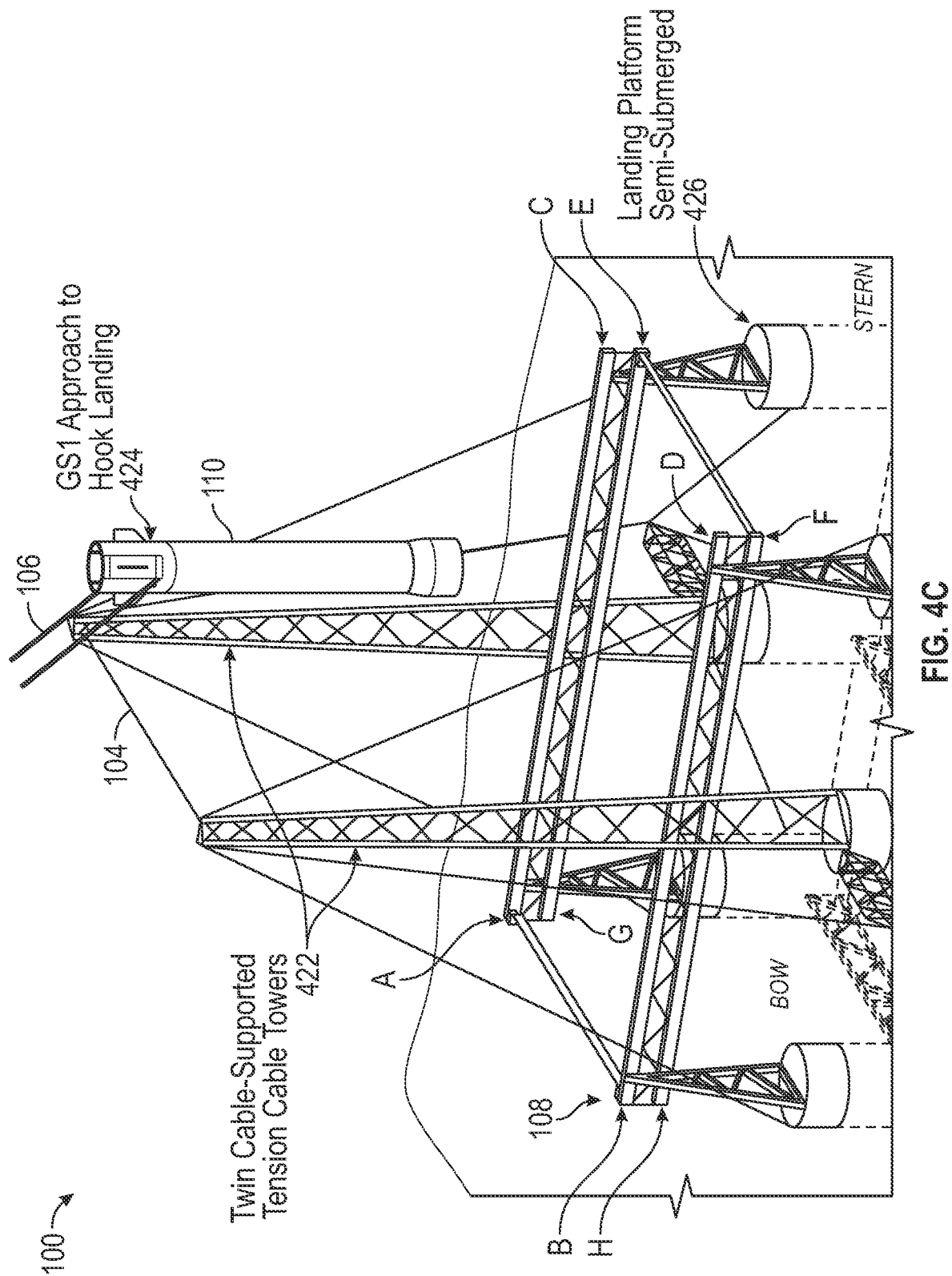
FIG. 4C illustrates an example approach of a rocket to the system of FIGS. 1A and 1B.

FIG. 4C illustrates an example approach 424 of the rocket 110 relative to the vessel 108. As illustrated, the vessel 108 can include one or more towers 422, which may be twin cable-supported, tension cable towers. The towers 422 may be on a landing platform 426 or support pillars, portions of which can be at least partially submerged. The cable 104 may be suspended across the towers 422. The rocket 110 may approach the cable 104 during descent. As illustrated, the approach 424 or direction of terminal flight may be at an angle with respect to the horizon. For example, the direction of terminal flight may be negative 45 degrees (−45°), or another angle, relative to the horizon. In this example, two boom arms 106 configured to engage with the cable 104 are positioned at a hook-landing position 420 that is substantially perpendicular to the direction of terminal flight.

Figure 4D:
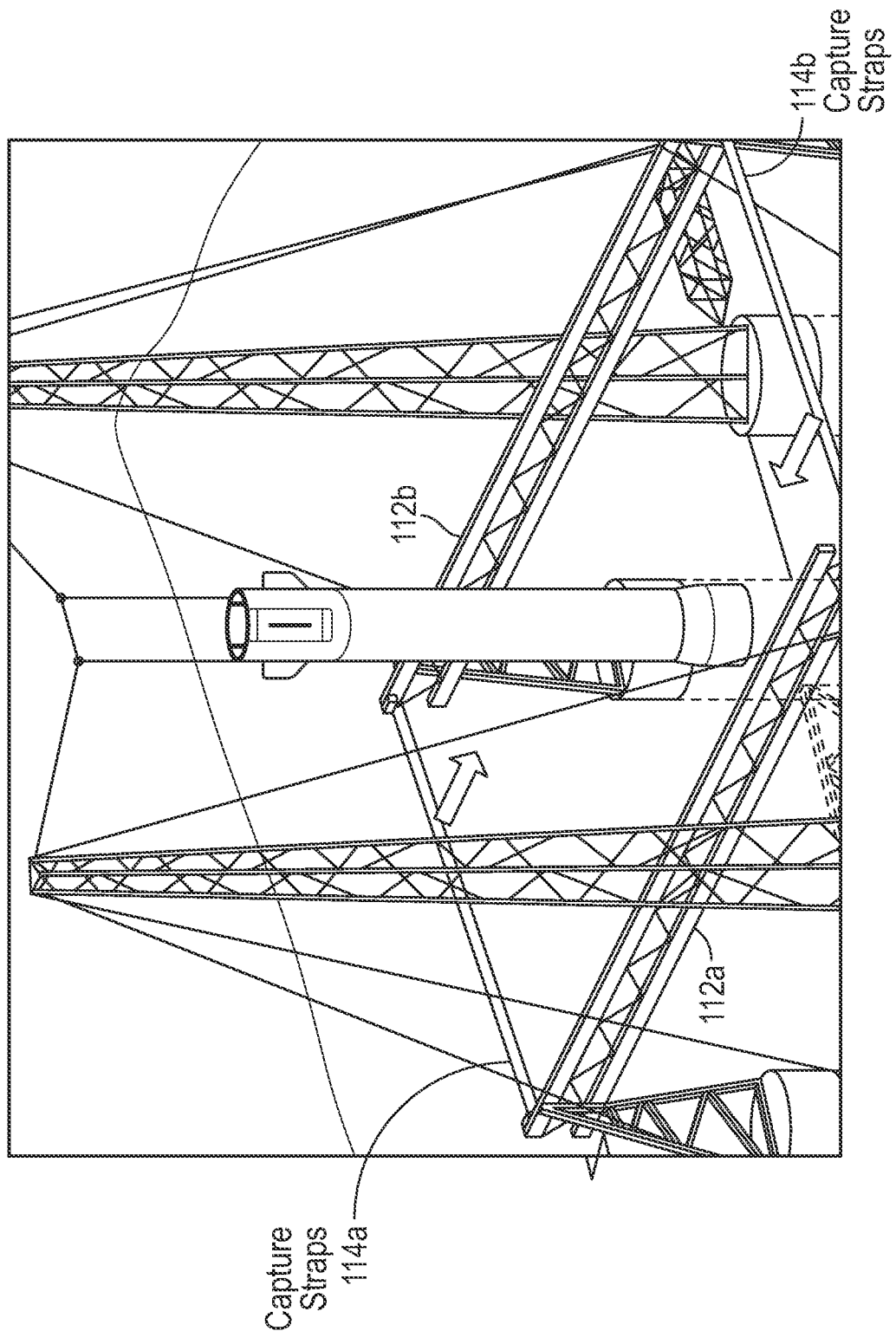
FIGS. 4D and 4E illustrate example movement of capture straps to engage with a suspended rocket that may be used with the systems of FIGS. 1A and 1B.
Figure 4E:
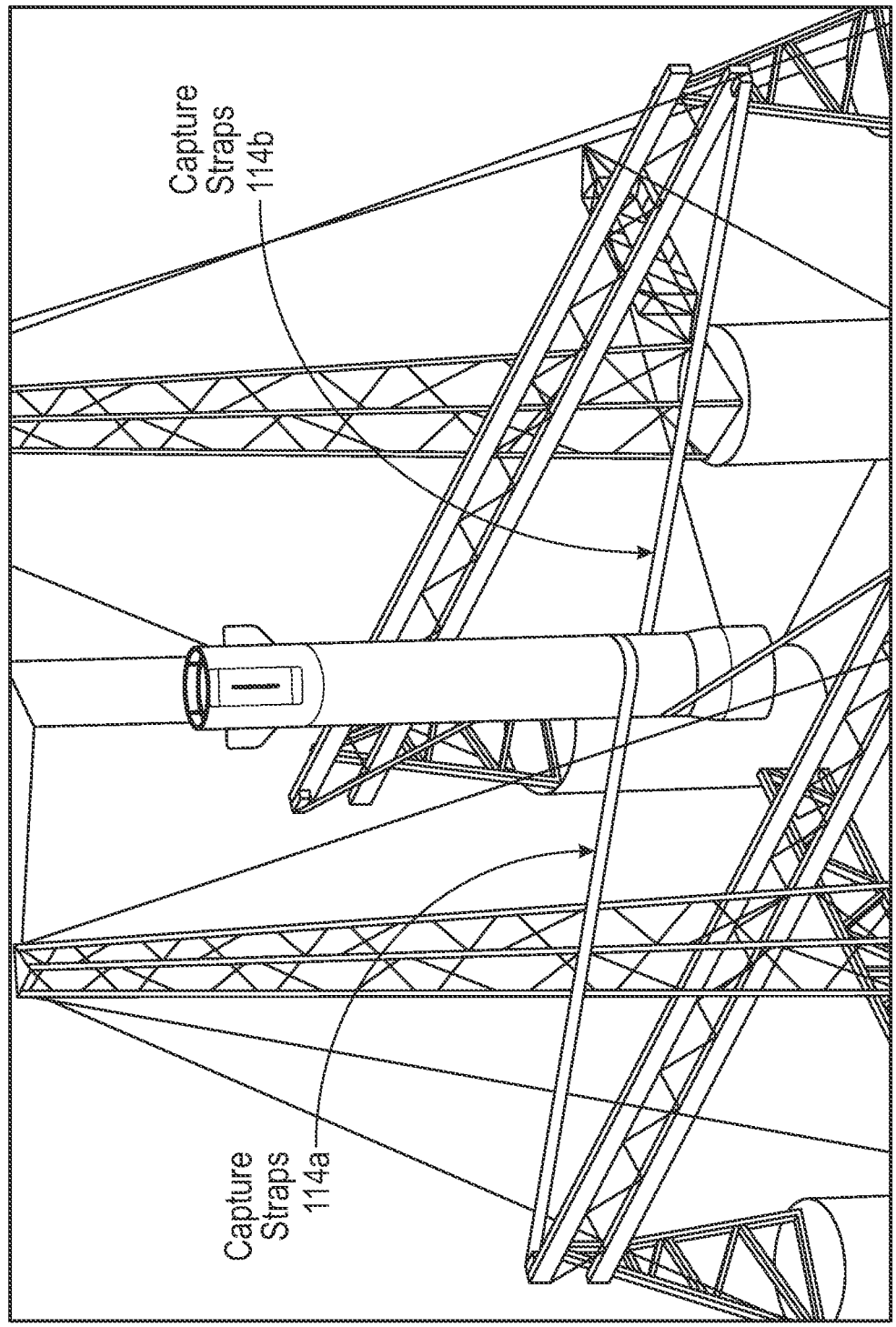

Returning to FIG. 4A, the process 120 next moves to step 128, in which the system 100 dampens the movement of the rocket 110 relative to the vessel 108 with capture straps. As illustrated in FIGS. 4D and 4E, a landed rocket 110 may be engaged with capture straps. FIG. 4D illustrates the system 100 as viewed from the starboard bow of the vessel 108, while FIG. 4E illustrates the system 100 as viewed from the port quarter of the vessel 108. As described above with reference to FIGS. 1A and 1B, capture straps 114a, 114b are suspended across the rocket receiving space 101 in a first position prior to rocket engagement with the system 100, and configured to move across the rocket receiving space 101 to a second position after the rocket 110 engages the system 100. In the example illustrated in FIGS. 4C and 4D, a first end and a second end of the strap 114a are initially positioned at first ends of the rails 112a, 112b, respectively. A first end and a second end of the strap 114b are initially positioned at second ends of the rails 112a, 112b, respectively. As shown in FIGS. 1B and 4E, after the rocket 110 engages the cable 104 of the system 100, the first end and the second end of the strap 114a move to the second ends of the rails 112a, 112b, respectively. The first end and the second end of the strap 114b also move to the first ends of the rails 112a, 112b, respectively. The straps 114a, 114b may be configured to shorten or lengthen by, for example, paying out length from a spool or retracting length from a spool. Each of the straps 114a, 114b may have at least one associated spool that may be driven at one or both ends of each of the straps 114a,114b. One or more of the spools may be driven by an actuator, such as a multi-phase motor. Advantageously, using a motor driven spool at each end of a strap 114a, 114b may allow for redundancy and for one or more motors associated with a strap 114a, 114b to act as a brake for shortening or lengthening the strap 114a, 114b.

In some embodiments, the straps 114a, 114b may be connected to a device that pays out the strap. Such device may be a pulley on a motor, where the strap may be allowed to pay out due to the weight of the rocket bearing on the strap and lengthen the strap and the motor may be actuated to reel in the strap and shorten its length. The device may be translated along the rails 112a, 112b as described. In some embodiments, the straps 114a, 114b may be elastic and configured to lengthen in response to increased force applied to the strap due to the rocket bearing on the strap. The straps may then self-contract when the ends of the strap are moved such that the force from the rocket on the strap decreases. In some embodiments, elastic straps may pay out from and reel back into a device such as described.

A motor may be configured to move the capture straps 114a, 114b from the first position, such as illustrated in FIGS. 1A, 1B, 4C and 4D, where the capture straps 114a, 114b are not engaged with the rocket 110, to the second position, such as illustrated in FIGS. 1B and 4E, where the capture straps 114a, 114b are engaged with the rocket 110. In some examples, the ends of each capture strap 114a, 114b may be configured to move from one end of a set of rails 112 to another end of a set of rails 112 so as to sweep across a respective plane in the rocket receiving space 101 of the vessel 108. The ends of the strap 114a may sweep across a first plane, and the ends of the strap 114b may sweep across a second plane that is substantially parallel to the first plane. The two planes may be offset in the "Z" or vertical direction. As a result of this sweep, each of the capture straps 114a, 114b may be configured to engage with a portion of the rocket so as to apply a force on the body of the rocket in a direction corresponding to the direction the capture strap moved between the first position and the second position. Advantageously, use of two or more capture straps moving in opposing directions may engage a rocket so as to apply opposing, or substantially opposing, forces on the body of the rocket, at two or different heights along the length of the rocket body. These opposing forces may serve to dampen motion of the rocket. For example, two capture straps configured to engage the rocket by traveling across the rocket receiving space in opposing directions may provide opposing forces at two different positions on the rocket body that are located within two different planes defined by movement of the capture straps from the respective first position to the respective second position. Where the rails are substantially horizontal and the planes defined by movement of the capture straps are substantially horizontal, this engagement may result in dampened horizontal movement of the rocket, as well as dampening of other types of motion of the rocket.

Returning to FIG. 4A, the process 120 next moves to optional step 130, where the system 100 dampens the movement of the rocket 110 with a braking system. In some embodiments, the system 100 includes a dampening system, such as but not limited to a sea water braking or dampening system. The dampening system may be configured to reduce vertical motion or vertical forces after engagement of the rocket with the cable. FIGS. 4F and 4G illustrate an example sea water dampening system 502 that may be part of or incorporated within the vessel 108. As illustrated in FIG. 4F, the dampening system 502 may be configured to be placed at a support location of a cable. In some examples, the dampening system 502 may be configured to be in the interior portion of a support pillar for a tower. There may be two or more dampening systems 502. For example, there may be a dampening system 502 under each tower configured to support the cable 104.

As illustrated in FIG. 4F, before a rocket engages with the cable 104, the cable 104 may be in a first position 504. The first position 504 may be taut, or otherwise suspended between the towers 102 with a certain amount of tension. Once the rocket engages with the cable 104, the cable 104 may be in a second, lower position 506 relative to the first position 504. The second position 506 may be displaced relative to the first position 504 based on the weight of the engaged rocket 110 applying a downward force on the cable.

As illustrated in FIG. 4G, a dampening system 502 may include a motor or spool system 508 configured to move or transfer a force, or provide a desired amount of tension, to a suspended cable 104. For example, synchronized motors located in support pillars of two towers supporting the cable 104 can be used to center the rocket between booms. In some examples, a dampening system may include a spool and piston, wherein the cable is at least partially wrapped on the spool and the piston is attached to the cable. In some examples, the piston is at least partially in a sea water-filled chamber. Additionally or alternatively, the dampening system may use seawater to dampen motion of a baffle plate 514 coupled to the cable 104 via a rod. In some examples, the dampening system may include a piston coupled to the cable in addition or in the alternative to a baffle plate 514. For example, the dampening system 502 can include a chamber 512 located above a pontoon 516 of the vessel 108. The chamber 512 may house the baffle plate 514, which is coupled to the cable 104 and spool system 508 via a rod. The chamber 512 can be configured to fill with sea water to dampen movement of the plate 514 in the vertical direction. The dampening system 502 may include a brake or braking system 510 configured to provide a stopping force to the rod as it moved in a vertical direction. A plurality of dampening systems may be synchronized. It will be understood that in addition to dampening vertical movement of the engaged rocket, the dampening system 502 can be configured to reposition the engaged rocket relative to the vessel 108. For example, synchronized motors of the dampening system 502 can be used to center a rocket within the rocket receiving space of the vessel 108.

Returning to FIG. 4A, the process 120 next moves to step 132, in which the system 100 lowers the rocket 110 onto a transport vehicle, such as a transport ship. For example, the system 100 may use one or more components engaged with the rocket for dampening and/or capture to lower the rocket to the deck of a transport ship. In some examples, the system 100 may at least partially further submerge the vessel 108 at step 132. The submersion may be sufficient to allow a transport vessel or ship to dock in the ship receiving space 103 of the vessel 108. The ship receiving space 103 may be located between support pillars of the vessel 108. After the transport ship is in position, ballast may be purged from the vessel 108 to effectively dry-dock the transport ship on the vessel 108. The transport ship 606 may be supported by ship support members 118 when the transport ship 606 is dry-docked on the vessel 108. The ship support members 118 can be configured to be submerged below a waterline of the vessel 108 as the rocket 110 is received on the cable 104 and the transport ship enters the ship receiving space 103, and further configured to be above the waterline of the vessel 108 as the rocket 110 is lowered onto the transport ship 606.

Figure 4H:
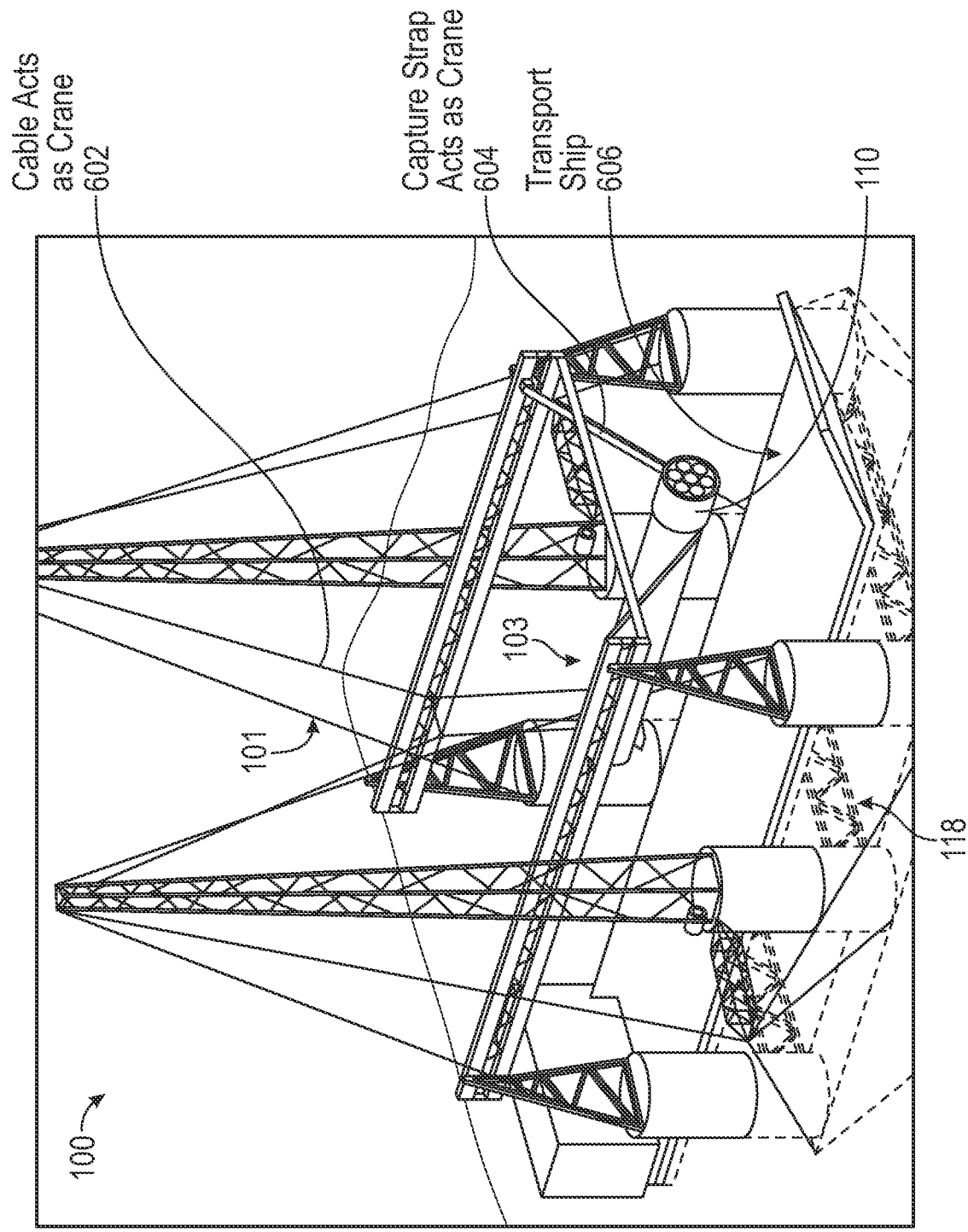
FIG. 4H illustrates an example rocket receiving system shown lowering a rocket onto a ship that may be used with the systems of FIGS. 1A and 1B.

FIG. 4H illustrates an example of the system 100 lowering the rocket 110 in a horizontal orientation onto a transport or ship 606 that has been dry-docked on the vessel 108. As illustrated, the system 100 may lower an engaged rocket 110 by jointly using the cable 104 and the capture strap 114a as a crane. For example, a top portion of a rocket may be engaged, via the boom arms, with the cable 104. The system 100 may use the synchronized motors in the dampening system 503, such as that described above, to lower the cable 104. The system may also shorten the capture strap 114a as it continues to support a lower portion of the rocket 110. In one example, the capture strap 114a is reeled into a reel mechanism located at the second ends of the rails 112a, 112b, thereby shortening the length of the strap 114a. This combined action of lengthening and lowering the cable 104 and shortening the capture strap 114a results in the top portion of the rocket that is engaged with the cable rotating toward the stern section of the transport ship 606 and rotating the lower portion of the rocket 110 that is supported by the capture strap 114a towards the bow section of the transport ship 606. The capture strap 114a may be used to rotate the rocket 110 in this manner after the capture strap 114b is moved from the second position back to the first position. Lowering the cable 104 while shortening the capture strap 114a results in the rocket 110 moving from a vertical landed position to a more horizontal landed position, such as illustrated in FIG. 4H. The cable 104 may be further lowered as the length of the capture strap 114a is increased (by paying out more length using the reel mechanism) to lower the rocket 110 onto the deck of the transport ship 606. In one example, the rocket 110 is lowered onto supporting stands on the deck of the transport ship. Once lowered, the rocket 110 may be secured onto the transport ship 606, the vessel 108 may submerge using the ballast system described above to undock the transport ship 606 from the vessel 108, and the transport ship 606 may transport the rocket 110 away from the vessel 108 to a new location.

E. Example Dynamic Model

Figure 5:
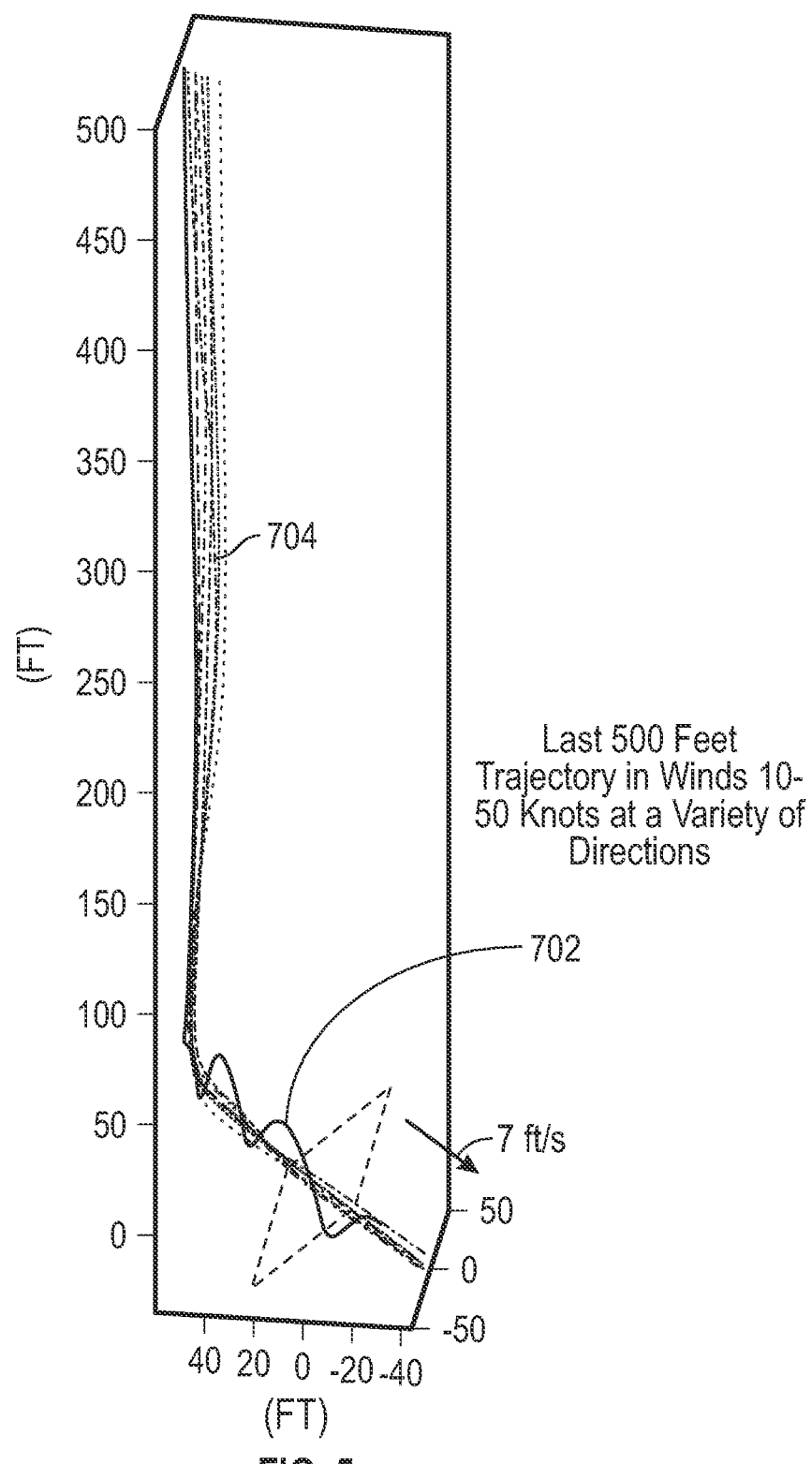
FIG. 5 illustrates example simulations of a rocket trajectory where the rocket experiences a variety of conditions during a capture sequence, such as a capture sequence using a system of FIGS. 1A and 1B.

FIG. 5 illustrates example simulations of the last 500 feet of a rocket trajectory where the rocket experiences a variety of constant side winds from 10-50 knots at various relative angles around the compass. The x-axis dimension of the graph illustrated in FIG. 5 corresponds to feet of the center of the boom arms of a descending rocket (such as boom arms 106 of a rocket 110 illustrated in FIG. 2B) in a hook-landing position (for example, hook-landing position 420 illustrated in FIG. 4B), relative to the center of a cable (such as the cable 10 in FIGS. 1A-1C or the cable 302 in FIG. 3). The requirement to land on a sea-based (pitch and rolling) platform in high winds has led to the development of technologies to address rocket trajectory in such conditions. For example, forward on/off thrusters may be included on a vehicle to counter the immediate effects of winds directly (without relying on the need to reorient the vehicle in response) which also provides the means to match a pitching deck during landing. A control mixer can be used to simultaneously command engine thrust, Thrust Vector Control (TVC) angle and forward thruster on/off commands to achieve all 6DOF (six degrees of freedom) control authority force. Additionally, a Dual Quaternion-based steering law can be used, which not only controls landing position in the East-North frame and vertical speed but controls vertical position, vehicle orientation, and exact time along a desired landing trajectory. As such, deck motion compensation on capture is feasible and complex curvilinear landing profiles can be followed, not just a vertical decent. This approach enables glide slope approaches to the hooked landing mechanism in accordance with the present disclosure.

To demonstrate this capability, a nonlinear 6DOF landing simulation may be modified to provide a negative 45 degree (−45°) glideslope trajectory approach to a capture window measuring 100 feet wide by 60 feet high (perpendicular to glide slope path). A dashed trapezoidal shape illustrates the target capture window, or target capture box, which would yield a safe capture with both boom arms engaging the cable. This simulation includes simple, but characteristic, models of the vehicle engine, TVC and forward thrusters, a low fidelity aerodynamic model, and assumes perfect navigation and knowledge of the vehicle mass properties. The simulation was repeated with a variety of constant side winds from 10-50 knots at various relative angles around the compass. The last 500 feet of the simulated trajectories are shown in FIG. 5. Additionally, this simulation was run using a 3-sigma random Gram wind model (corresponding to line 704 of FIG. 5). All trajectories utilized the center engine only, except the trajectory 702, which uses an off-center main engine with low level winds. The control mixer can accommodate this asymmetric control case, at reduced performance, demonstrating the feasibility of systems and methods of receiving a descending rocket in accordance with the present disclosure.

The results shown in FIG. 5 indicate that the capabilities developed to land the rocket in the baseline platform scenario, also provide the capability needed to support a hooked landing approach using system and methods of the present disclosure.

Various control systems to control a descending rocket 110 in accordance with the simulation illustrated in FIG. 5 can be suitably implemented in the system 100. For example, a control system can use a variable thrust engine and thrust vector control to control vertical descent, vehicle translation, and vehicle attitude of the descending rocket 110. A Thrust Vector Control (TVC) control system can be augmented with thrust devices and/or aerodynamic devices to expand the control maneuvering capability in higher wind environments. Additional features from control systems for vertically landing a rocket body that uses landing gear can also be implemented.

Systems for controlling the descent and capture of the rocket 110 in accordance with the present disclosure are advantageously tailored for embodiments of the system 100 operating at sea. In contrast to control systems for landing a rocket on a fixed platform, the control system for a system 100 can control the flight trajectory of the rocket 100 to a non-vertical flight path and an approach direction to the system 100 as it moves in the water based on a variable sea state. In addition, unlike control systems for landing rockets with landing gear (on fixed or moving platforms), the hook-and-cable based system 100 is significantly more tolerant to rocket tilt angle at capture. In addition, after the rocket 110 is engaged and secured in the system 100 and rocket engines are shut down, the rocket 110 is in a very stable position, independent of sea state. This is particularly advantageous as sea conditions can change quickly and unpredictably. When landing rockets having typical landing gear, the risk of rocket tip is high if the rocket is tilted or has lateral velocity at touchdown. This risk of rocket tip is eliminated in embodiments of the system 100. Accordingly, embodiments of the system 100 according to the present disclosure are more tolerant to adverse environmental conditions, such as high winds and high sea states.

F. Example Applications

Aspects of systems and methods disclosed herein may be applied in a land-based capture system. Systems and methods may be used for a land-based return to base mission. For example, aspects of the system 100 associated with sea-based or water-based systems, such as water dampers for cables, may be replaced with motor dampers, magnetic dampers, or other land-based solutions. In another example, the transport may be a transport vehicle configured to capture a landed rocket for transport across land. Other examples may also be possible. Aspects of systems and methods disclosed herein may additionally or alternatively be applied to a reusable second stage of a rocket.

In some examples, a system for receiving a descending rocket, such as a rocket 110 illustrated in FIGS. 1A and 1B, may include a vessel or structure on land or at least partially on land. A land-based vessel or structure (or partially land-based vessel or structure) may include a permanent structure, semi-permanent structure, mobile structure, mobile vessel, some combination thereof or the like. In some examples, portions of a land-based vessel or structure may be configured to be partially secured, completely secured, or unsecured to the ground or other support system. Portions of the vessel or structure may be configured to be movable or mobile so that at least some of the vessel or structure can be moved to a new location. In some examples, portions of the vessel or structure may be secured (or non-mobile) and configured to receive a mobile or movable portion.

Figure 1C:
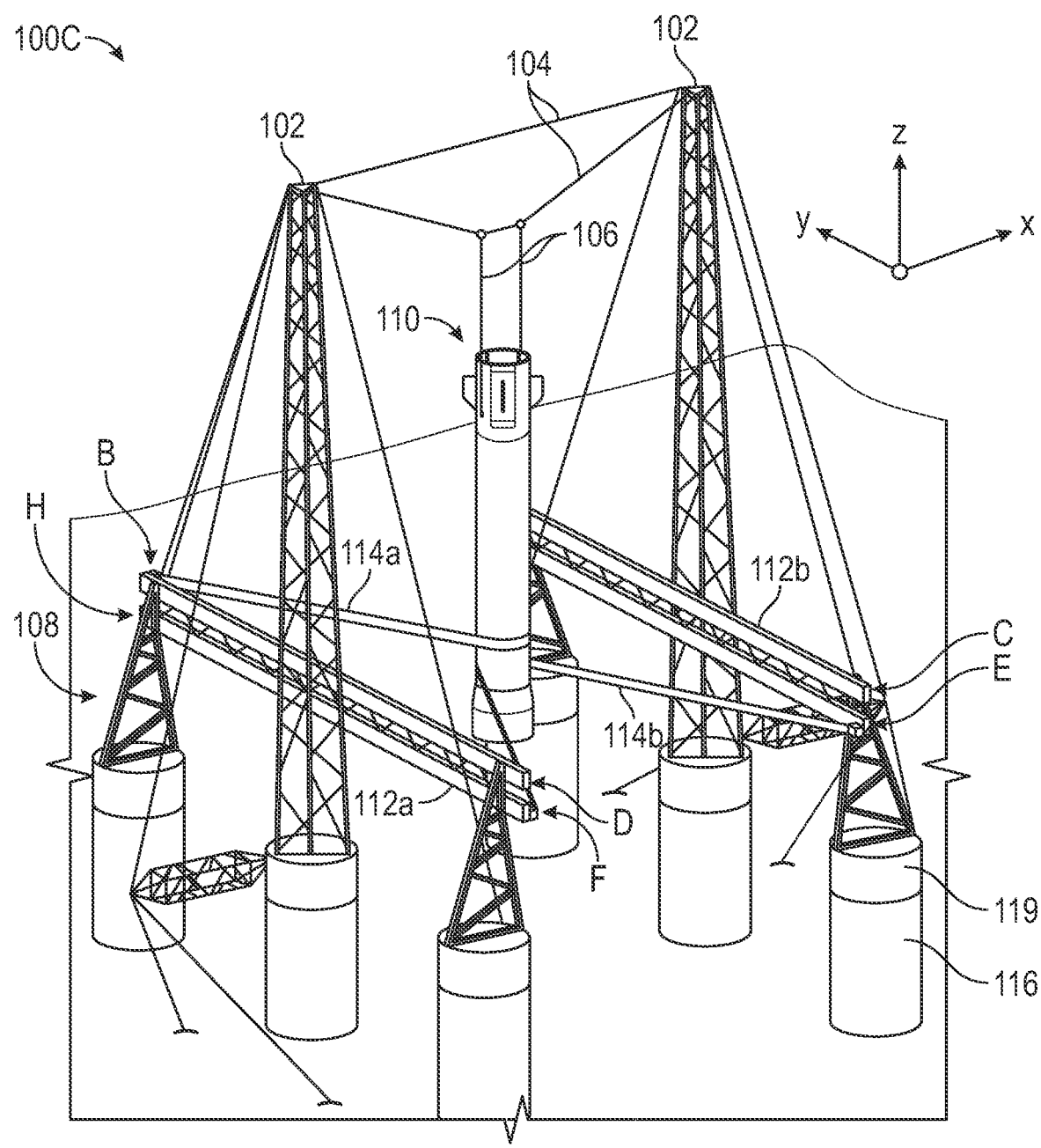
FIG. 1C illustrates an example land-based system for receiving and stabilizing a descending rocket.

FIG. 1C illustrates an example land-based system 100C configured to receive a descending rocket 110 in accordance with embodiments of the present disclosure. The land-based system 100C can be implemented in a return to base mission in which a descending rocket 110 is received and stabilized by the system 100C near a launch site of a multi-stage rocket. In one non-limiting example, the descending rocket 110 is a first stage returning to a ground-based landing site. In another non-limiting example, the descending rocket 110 is a reusable second stage returning to a ground-based landing site. The vessel or structure of the system 100C may include a plurality of towers 102. In example configurations where at least a portion of the vessel or structure is secured to the ground or other support system, at least a portion of one or more of the plurality of towers 102 may be embedded in or attached to the ground or attached to a support structure or supports 116. The supports 116 may include portions 119 that can be configured to raise and lower in the z-direction, in order to raise and lower the towers 102 in z-direction for a particular use case or to position a captured rocket 110 at a particular height relative to the ground. The towers 102 may be configured to support one or more cables 104. The towers 102 may be spaced so that a rocket 110 may be received into a rocket receiving space between the towers 102. The height of the towers 102 may be greater than the combined height of the rocket 110 in a substantially vertical orientation and the length of fully-extended rocket boom arms. The height of the towers 102 may allow for displacement of a cable or other retention device in the z-direction (or vertical direction) when a rocket 110 is suspended from the cable, such that a base of the rocket 110 remains suspended above the ground after the rocket 110 is captured by portions of the vessel or structure. The rocket 110 may descend from flight and be received into the rocket receiving space. The rocket receiving space may be an opening in the structure or vessel defined at least in part by opposing towers. In some examples, there may be at least a first and second tower configured to extend vertically from respective supported positions and spaced apart at a distance to define an upper portion of a rocket receiving space.

The vessel or structure may include a plurality of cables 104 configured to be supported by the plurality of towers. The cables may be configured with respect to the towers in a similar manner as described above with reference to FIGS. 1A and 1B. For example, the cable(s) 104 may be suspended from a top or upper portion of a tower (or other structure) to a top or upper portion of another tower (or other structure). The cable(s) may be 104 supported or otherwise anchored at another location on the vessel or structure other than the tower, another structure separate from the vessel or structure, the ground, the like or a combination thereof. The cable(s) 104 may be supported or otherwise anchored at one or more locations. Support mechanism(s), such as described above, may be configured to anchor or support the cable(s) with enough tension to allow the cable(s) to flex, stretch, or otherwise engage the rocket without breaking or damaging the rocket or cable(s) and/or in order to support some or all of the weight of the rocket.

In some examples, the vessel or structure may include a plurality of rails, such as rails 112a, 112b, similar to rails 112a, 112b described above with reference to FIGS. 1A and 1B. The rails 112a, 112b may be configured to be near a base of one or more towers 102, such as described above. The plurality of rails 112a, 112b may be configured to support one or more straps 114a, 114b, similar to straps 114a, 114b described above with reference to FIGS. 1A and 1B. Each strap 114a, 114b may include one or more ends movably coupled to one or more of the rails, such as described above with reference to FIGS. 1A and 1B. One or more of the straps 114a, 114b may be configured to lengthen, shorten, or stretch between its respective ends in a manner such as described above with reference to FIGS. 1A and 1B. For example, the movable straps may be connected to a movable connection to connect the strap to a respective rail. The connection may be or include a device that pays out the strap, such as a pulley on a motor. The connection may be translated along the rails.

The vessel or structure may be configured to receive and stabilize a rocket, such as a rocket 110, described herein. The vessel or structure may include at least one cable 104 configured to support some or all of the weight of the rocket, such as described herein. Straps of the vessel or structure may be moved so as to engage a portion of the rocket, such as described herein. The straps may help reduce translational and/or rotational movement of the rocket. Other movement dampeners or stabilizing may additionally or alternatively be used.

Once secured, at least a portion of the vessel or structure may be configured to receive a transport vessel, such as a truck or other mobile vessel into a vessel receiving space that may be below the rocket receiving space of the vessel or structure. The vessel receiving space may share common components or structures with the rocket receiving space of the vessel or structure. One or more components of the structure may be configured to transfer the rocket from the rocket receiving space onto the transport vessel. The one or more components may include cables and/or straps. In some examples, at least a portion of the vessel or structure may be configured to itself transport the secured rocket. For example, the vessel or structure itself, or part of the vessel or structure, may be stationary during receipt of the rocket into the rocket receiving space and movable, such as on wheels or along rails, after the rocket is received and stabilized.

G. Terminology

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

Reference throughout this specification to "some embodiments" or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics can be combined in any suitable manner, as would be apparent to one of ordinary skill in the art from the present disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the present disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

Although described in the illustrative context of certain embodiments and examples, it will be understood by those skilled in the art that the present disclosure extends beyond the specifically described embodiments to other alternative embodiments and/or uses and obvious modifications and equivalents. Thus, it is intended that the scope of the claims which follow should not be limited by the particular embodiments described above.

What is claimed is:

1. A rocket configured to descend in a terminal flight path having a non-vertical component, the rocket comprising:
   a body extending along a longitudinal axis; and
   at least one arm rotatably connected with the body and having at least one hook, the at least one arm configured to rotate in a plane tangential to an outer surface of the body, the at least one hook configured to engage a cable suspended at sea to suspend the rocket from the cable.

2. The rocket of claim 1, wherein the rocket is configured to descend in a terminal flight path having a glide slope of −45 degrees.

3. The rocket of claim 1, wherein the at least one arm is configured to be locked in an orientation that is substantially perpendicular to the direction of the terminal flight path.

4. The rocket of claim 1, wherein the arm is configured to rotate 360 degrees.

5. The rocket of claim 1, where the rocket comprises a control mixer configured to simultaneously command engine thrust of the rocket, Thrust Vector Control (TVC) angle of the rocket, and a forward thruster of the rocket.

6. A method of receiving a descending rocket, the method comprising:
   descending a rocket along a flight path having a non-vertical component with a nose of the rocket located higher than a nozzle of the rocket;
   rotating an arm of the rocket in a plane tangential to an outer surface of a body of the rocket; and
   engaging a hook of the arm with a cable suspended by a semisubmersible platform at sea.

7. The method of claim 6, further comprising rotating the rocket to a substantially horizontal orientation.

8. The method of claim 6, further comprising decreasing a draft of the platform to raise the platform relative to sea level.

9. The method of claim 7, further comprising receiving a ship at least partially into a ship-receiving space of the platform and placing the horizontally-oriented rocket onto the ship.

10. The rocket of claim 1, wherein the at least one hook comprises a plurality of hooks arranged at a plurality of locations along the at least one arm.

11. The rocket of claim 1, wherein the at least one arm comprises a plurality of arms arranged around a circumference of the body of the rocket.

12. The rocket of claim 1, wherein the at least one arm comprises two arms diametrically arranged around the body of the rocket.

13. The rocket of claim 1, wherein the at least one hook comprises at least one self-closing hook.

14. The rocket of claim 1, wherein the at least one arm is rotatably connected with the body at a confluence of a longeron and a bulkhead frame of the rocket.

15. The rocket of claim 1, wherein the body comprises at least one forward fin at a cylindrical portion of the body, and wherein the at least one arm is rotatably connected with the body at a point on the body that is 45° from a location of the forward fin.

16. The method of claim 6, wherein the arm of the rocket is rotatably coupled to a body of the rocket.

17. The method of claim 16, wherein rotating the arm of the rocket comprises causing the arm to rotate from a stored position to a position where the arm is oriented substantially perpendicular to the direction of the flight path.

18. The method of claim 17, wherein the stored position comprises a position wherein a majority of a length of the arm is stored adjacent to a side of the body.

19. The method of claim 17, wherein the arm of the rocket is stored at the stored position at least during take-off or reentry of the rocket.

* * * * *